US011002529B2

(12) United States Patent
Nahum

(10) Patent No.: US 11,002,529 B2
(45) Date of Patent: May 11, 2021

(54) ROBOT SYSTEM WITH SUPPLEMENTARY METROLOGY POSITION DETERMINATION SYSTEM

(71) Applicant: Mitutoyo Corporation, Kawasaki (JP)

(72) Inventor: Michael Nahum, Seattle, WA (US)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 17/071,974

(22) Filed: Oct. 15, 2020

(65) Prior Publication Data

US 2021/0025692 A1 Jan. 28, 2021

Related U.S. Application Data

(63) Continuation-in-part of application No. 16/146,640, filed on Sep. 28, 2018, now Pat. No. 10,871,366, (Continued)

(51) Int. Cl.
| | |
|---|---|
| *G01B 11/00* | (2006.01) |
| *B25J 13/08* | (2006.01) |
| *B25J 11/00* | (2006.01) |
| *G01B 11/26* | (2006.01) |
| *B25J 19/02* | (2006.01) |
| *B25J 15/00* | (2006.01) |

(52) U.S. Cl.
CPC .......... *G01B 11/005* (2013.01); *B25J 11/005* (2013.01); *B25J 13/081* (2013.01); *B25J 13/089* (2013.01); *B25J 19/023* (2013.01); *G01B 11/26* (2013.01); *B25J 15/0019* (2013.01)

(58) Field of Classification Search
CPC ...... B25J 13/089; B25J 13/081; B25J 11/005; B25J 19/023; B25J 15/0019; G01B 11/26

USPC .................................................. 700/245–264
See application file for complete search history.

(56) References Cited

U.S. PATENT DOCUMENTS

| | | | |
|---|---|---|---|
| 4,613,943 | A | 9/1986 | Miyake et al. |
| 4,725,965 | A | 2/1988 | Keenan |

(Continued)

OTHER PUBLICATIONS

Krajnik et al., "External Localization System for Mobile Robotics," 16th International Conference on Advanced Robotics (ICAR), Nov. 25-29, 2013, Montevideo, Uruguay. (6 Pages).

(Continued)

*Primary Examiner* — Jaime Figueroa
(74) *Attorney, Agent, or Firm* — Seed IP Law Group LLP

(57) ABSTRACT

A supplementary metrology position determination system is provided for use with a robot. The robot includes a movable arm configuration and a motion control system configured to control an end tool position with a robot accuracy (i.e., based on sensors included in the robot). The supplementary system includes cameras and 2D scales, each of which is attached to the movable arm configuration (e.g., as attached on arm portions and/or rotary joints). The cameras are operated to acquire images for determining relative positions of the scales. The scales may be coupled to rotary joints (e.g., as may be utilized to determine rotary motion as well as any motion transverse to a rotary axis), and/or to arm portions (e.g., as may be utilized to determine any bending or twisting of the arm portions). Such information may be utilized to achieve higher accuracy (e.g., for measurement operations and/or control of the robot, etc.).

21 Claims, 15 Drawing Sheets

Related U.S. Application Data which is a continuation-in-part of application No. 16/104,033, filed on Aug. 16, 2018, now Pat. No. 10,751,883.

(56) References Cited

U.S. PATENT DOCUMENTS

| | | | |
|---|---|---|---|
| 4,831,549 A * | 5/1989 | Red | G05B 19/4182 |
| | | | 700/254 |
| 5,086,401 A * | 2/1992 | Glassman | B25J 9/1679 |
| | | | 700/259 |
| 5,105,368 A | 4/1992 | Alexandersen et al. | |
| 5,297,238 A | 3/1994 | Wang et al. | |
| 5,617,335 A | 4/1997 | Hashima et al. | |
| 5,798,947 A | 8/1998 | Ye et al. | |
| 5,876,325 A | 3/1999 | Mizuno et al. | |
| 6,222,940 B1 | 4/2001 | Wenzel et al. | |
| 6,640,008 B1 | 10/2003 | Lee et al. | |
| 6,681,151 B1 | 1/2004 | Weinzimmer et al. | |
| 6,781,694 B2 | 8/2004 | Nahum et al. | |
| 6,937,349 B2 | 8/2005 | Jones et al. | |
| 7,105,753 B1 | 9/2006 | Lapstun et al. | |
| 7,532,949 B2 | 5/2009 | Ban et al. | |
| 7,845,560 B2 | 12/2010 | Emanuel et al. | |
| 8,792,963 B2 | 7/2014 | Zhao et al. | |
| 8,981,324 B2 | 3/2015 | Rigney et al. | |
| 8,989,898 B2 | 3/2015 | DeVlieg | |
| 9,050,728 B2 | 6/2015 | Ban et al. | |
| 9,572,549 B2 | 2/2017 | Belevich et al. | |
| 9,797,706 B2 | 10/2017 | Jordil et al. | |
| 10,058,996 B2 | 8/2018 | Hosek et al. | |
| 10,099,380 B2 | 10/2018 | Ishige et al. | |
| 10,625,427 B2 | 4/2020 | Troy et al. | |
| 2003/0144765 A1 | 7/2003 | Habibi et al. | |
| 2005/0225278 A1 | 10/2005 | Ban et al. | |
| 2006/0017022 A1 | 1/2006 | Rigney et al. | |
| 2007/0296366 A1 * | 12/2007 | Quaid | B25J 13/025 |
| | | | 318/568.16 |
| 2009/0180667 A1 | 7/2009 | Mahan et al. | |
| 2009/0234502 A1 | 9/2009 | Ueyama et al. | |
| 2010/0331855 A1 | 12/2010 | Zhao et al. | |
| 2011/0029131 A1 | 2/2011 | Ban et al. | |
| 2013/0035791 A1 | 2/2013 | Chiu et al. | |
| 2013/0090554 A1 | 4/2013 | Zvuloni et al. | |
| 2013/0123982 A1 | 5/2013 | Chiu et al. | |
| 2013/0158947 A1 * | 6/2013 | Suzuki | G06F 15/00 |
| | | | 702/155 |
| 2014/0157610 A1 | 6/2014 | Garvey et al. | |
| 2014/0301632 A1 | 10/2014 | Ikeda et al. | |
| 2014/0343727 A1 * | 11/2014 | Calkins | B25J 9/1692 |
| | | | 700/248 |
| 2015/0158181 A1 | 6/2015 | Kawamura et al. | |
| 2016/0008988 A1 | 1/2016 | Kennedy et al. | |
| 2016/0039096 A1 | 2/2016 | Wallack et al. | |
| 2016/0136812 A1 | 5/2016 | Hosek et al. | |
| 2016/0151915 A1 | 6/2016 | Nishi et al. | |
| 2016/0223316 A1 | 8/2016 | Jordil et al. | |
| 2016/0291160 A1 * | 10/2016 | Zweigle | G01S 17/42 |
| 2017/0140521 A1 | 5/2017 | Sakaguchi et al. | |
| 2017/0148154 A1 | 5/2017 | Nakao | |
| 2017/0151671 A1 | 6/2017 | Ishige et al. | |
| 2017/0182665 A1 | 6/2017 | Okuyama et al. | |
| 2018/0004188 A1 | 1/2018 | Yamaguchi et al. | |
| 2018/0018778 A1 | 1/2018 | Haverkamp et al. | |
| 2018/0153437 A1 | 6/2018 | Schwartz et al. | |
| 2018/0272490 A1 | 9/2018 | Brenner et al. | |
| 2018/0279993 A1 | 10/2018 | Crawford et al. | |
| 2018/0361571 A1 | 12/2018 | Georgeson et al. | |
| 2018/0361595 A1 | 12/2018 | Troy et al. | |
| 2018/0373158 A1 * | 12/2018 | Baier | G03F 7/70158 |
| 2019/0005600 A1 | 1/2019 | Hazeyama | |
| 2019/0015980 A1 | 1/2019 | Kojima et al. | |
| 2019/0056218 A1 | 2/2019 | Ulmer et al. | |
| 2019/0099887 A1 | 4/2019 | Huang et al. | |
| 2019/0195607 A1 | 6/2019 | Nahum | |
| 2019/0256300 A1 | 8/2019 | Shimamura et al. | |
| 2019/0291277 A1 | 9/2019 | Oleynik | |

OTHER PUBLICATIONS

Perez et al., "Robot Guidance Using Machine Vision Techniques in Industrial Environments: A Comparative Review," Sensors 16(3):335, 2016. (26 pages).

Scara, URL=https://en.wikipedia.org/w/index.php?title=SCARA &oldid=838861482, Archive Date Apr. 29, 2018. (2 pages).

* cited by examiner

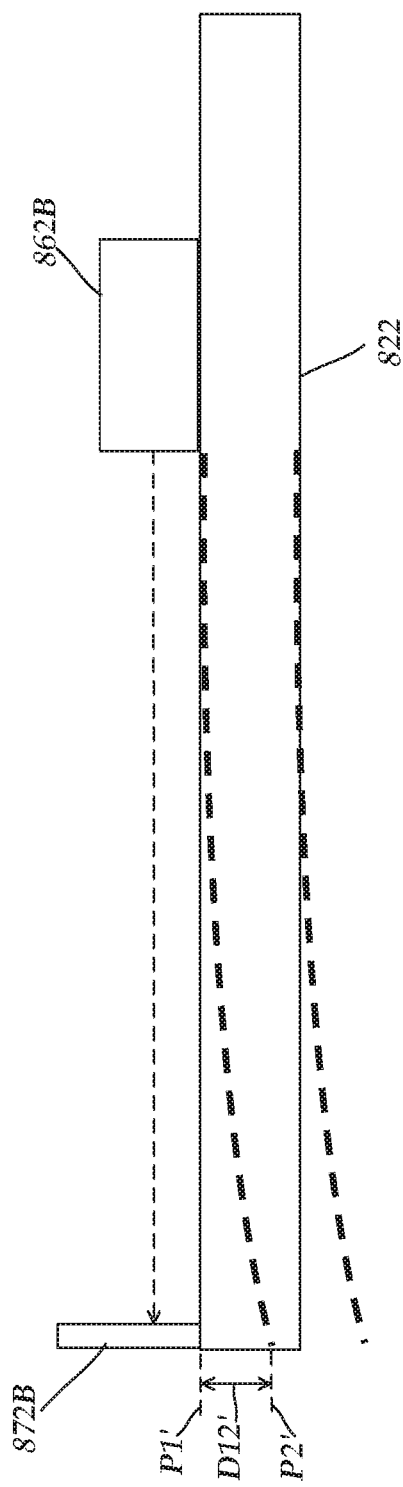

ROBOT SYSTEM WITH SUPPLEMENTARY METROLOGY POSITION DETERMINATION SYSTEM

CROSS-REFERENCE TO RELATED APPLICATION(S)

This application is a continuation-in-part of U.S. patent application Ser. No. 16/146,640, entitled "SUPPLEMENTARY METROLOGY POSITION COORDINATES DETERMINATION SYSTEM FOR USE WITH A ROBOT" filed on Sep. 28, 2018, which is a continuation-in-part of U.S. patent application Ser. No. 16/104,033, entitled "ROBOT SYSTEM WITH SUPPLEMENTARY METROLOGY POSITION COORDINATES DETERMINATION SYSTEM" filed on Aug. 16, 2018, which are hereby incorporated herein by reference in their entireties.

BACKGROUND

Technical Field

This disclosure relates to robot systems, and more particularly to systems for determining coordinates of an end tool position of a robot.

Description of the Related Art

Robotic systems are increasingly utilized for manufacturing and other processes. Various types of robots that may be utilized include articulated robots, selective compliance articulated robot arm (SCARA) robots, cartesian robots, cylindrical robots, spherical robots, etc. As one example of components that may be included in a robot, a SCARA robot system (e.g., which may be a type of articulated robot system) may typically have a base, with a first arm portion rotationally coupled to the base, and a second arm portion rotationally coupled to an end of the first arm portion. In various configurations, an end tool may be coupled to an end of the second arm portion (e.g., for performing certain work and/or inspection operations). Such systems may include position sensors (e.g., rotary encoders) utilized for determining/controlling the positioning of the arm portions and correspondingly the positioning of the end tool. In various implementations, such systems may have a positioning accuracy of approximately 100 microns, as limited by certain factors (e.g., the rotary encoder performance in combination with the mechanical stability of the robot system, etc.).

U.S. Pat. No. 4,725,965, which is hereby incorporated herein by reference in its entirety, discloses certain calibration techniques for improving the accuracy of a SCARA system. As described in the '965 patent, a technique is provided for calibrating a SCARA type robot comprising a first rotatable arm portion and a second rotatable arm portion which carries an end tool. The calibration technique is in relation to the fact that the SCARA robot may be controlled using a kinematic model, which, when accurate, allows the arm portions to be placed in both a first and second angular configuration at which the end tool carried by the second arm portion remains at the same position. To calibrate the kinematic model, the arm portions are placed in a first configuration to locate the end tool above a fixed datum point. Then, the arm portions are placed in a second angular configuration to nominally locate the end tool again in registration with the datum point. The error in the kinematic model is computed from the shift in the position of the end tool from the datum point when the arm portions are switched from the first to the second angular configuration. The kinematic model is then compensated in accordance with the computed error. The steps are repeated until the error reaches zero, at which time the kinematic model of the SCARA robot is considered to be calibrated.

As further described in the '965 patent, the calibration technique may include the use of certain cameras. For example, in one implementation, the datum point may be the center of the viewing area of a stationary television camera (i.e., located on the ground below the end tool), and the output signal of the camera may be processed to determine the shift in the position of the end tool from the center of the viewing area of the camera when the links are switched from the first to the second configuration. In another implementation, the second arm portion may carry a camera, and the technique may begin by placing the arm portions in a first angular configuration, at which a second predetermined interior angle is measured between the arm portions, to center the camera carried by the second arm portion directly above a fixed datum point. The arm portions are then placed in a second angular configuration, at which an interior angle, equal to the second predetermined interior angle, is measured between the arm portions, to nominally center the camera again above the datum point. The output signal of the camera is then processed to determine the shift in the position of the datum point, as seen by the camera, upon switching the arm portions from the first to the second angular configuration. The error in the known position of the camera is then determined in accordance with the shift in the position of the datum point as seen by the camera. The steps are then repeated as part of the calibration process until the error approaches zero.

While techniques such as those described in the '965 patent may be utilized for calibrating a robot system, in certain applications it may be less desirable to utilize such techniques (e.g., which may require significant time and/or may not provide a desired level of accuracy for all possible orientations of a robot during certain operations, etc.) A robot system that can provide improvements with regard to such issues (e.g., for increasing the reliability, repeatability, speed, etc. of the position determination during workpiece measurements and other processes) would be desirable.

BRIEF SUMMARY

This summary is provided to introduce a selection of concepts in a simplified form that are further described below in the Detailed Description. This summary is not intended to identify key features of the claimed subject matter, nor is it intended to be used as an aid in determining the scope of the claimed subject matter.

A supplementary metrology position determination system is provided for use in conjunction with a robot as part of a robot system. The robot (e.g., an articulated robot, a SCARA robot, a cartesian robot, a cylindrical robot, a spherical robot, etc.) includes a movable arm configuration and a motion control system. The movable arm configuration includes a first arm portion, a second arm portion, and an end tool mounting configuration for mounting an end tool. The first arm portion is mounted to a first rotary joint at a proximal end of the first arm portion. The first rotary joint has a first rotary axis. The first arm portion has a second rotary joint located at a distal end of the first arm portion. The second rotary joint has a second rotary axis. The second arm portion is mounted to the second rotary joint at a proximal end of the second arm portion, such that the second arm portion rotates about the second rotary joint. The end tool mounting configuration is located proximate to a distal end of the movable arm configuration. The motion control system is configured to control an end tool position of the end tool with a level of accuracy defined as a robot accuracy, based at least in part on sensing and controlling the angular positions of the first and second arm portions about the first and second rotary joints, respectively, using rotary sensors included in the robot. The supplementary metrology position determination system includes first and second two-dimensional (2D) scales, a first camera, a second camera, and a metrology processing portion. The first and second two-dimensional (2D) scales are coupled to the movable arm configuration at first and second 2D scale coupling locations, respectively. Each 2D scale includes a nominally planar substrate and a plurality of respective imageable features distributed on the planar substrate. The first camera is for acquiring an image of the first 2D scale at an image acquisition time. The first camera defines a first reference position and the first camera is coupled to the movable arm configuration at a first camera coupling location. The second camera is for acquiring an image of the second 2D scale at the image acquisition time. The second camera defines a second reference position and the second camera is coupled to the movable arm configuration at a second camera coupling location. The metrology processing portion is configured to determine a first relative position of the first 2D scale based at least in part on a first image of the first 2D scale as acquired by the first camera at a first image acquisition time, and determine a first relative position of the second 2D scale based at least in part on a first image of the second 2D scale as acquired by the second camera at the first image acquisition time.

The metrology processing portion may be further configured to determine coordinates of the end tool position at the first image acquisition time based at least in part on the determined first relative positions of the first and second 2D scales. The first 2D scale coupling location may be on the first rotary joint and a motion transverse to the first rotary axis during rotation of the first rotary joint may cause a change in the relative position of the first 2D scale. The metrology processing portion may be further configured to determine an angular orientation of the first 2D scale based at least in part on the first image of the first 2D scale as acquired by the first camera at the first image acquisition time. The first 2D scale coupling location may be on the first arm portion and at least one of a bending or twisting of the first arm portion may cause a change in the relative position of the first 2D scale (e.g., relative to the first camera and/or the corresponding first reference position). The metrology processing portion may be further configured to determine a second relative position of the first 2D scale based at least in part on a second image of the first 2D scale as acquired by the first camera at a second image acquisition time, and determine a second relative position of the second 2D scale based at least in part on a second image of the second 2D scale as acquired by the second camera at the second image acquisition time. The metrology processing portion may be further configured to determine the metrology position coordinates of a first end tool position at the first image acquisition time based at least in part on the determined first relative positions of the first and second 2D scales, and determine the metrology position coordinates of a second end tool position at the second image acquisition time based at least in part on the determined second relative positions of the first and second 2D scales. The metrology processing portion may be further configured to utilize the determined metrology position coordinates of the first and second end tool positions to determine a dimension that is related to a distance between the first and second end tool positions. The dimension may be a distance between first and second surface locations on a workpiece, and a contact point of the end tool may contact the first surface location on the workpiece at the first image acquisition time and contact the second surface location on the workpiece at the second image acquisition time. The end tool may be at least one of a touch probe or a scanning probe that is used for measuring the workpiece.

Also disclosed is a method for operating a supplementary metrology position determination system that is utilized with a robot. The method may be summarized as including: operating the first camera to acquire a first image of the first 2D scale at a first image acquisition time, the first camera being coupled to the movable arm configuration of the robot at a first camera coupling location and defining a first reference position and the first 2D scale being coupled to the movable arm configuration at a first 2D scale coupling location; operating the second camera to acquire a first image of the second 2D scale at the first image acquisition time, the second camera being coupled to the movable arm configuration of the robot at a second camera coupling location and defining a second reference position and the second 2D scale being coupled to the movable arm configuration at a second 2D scale coupling location; determining a first relative position of the first 2D scale based at least in part on the first image of the first 2D scale as acquired by the first camera at the first image acquisition time; and determining a first relative position of the second 2D scale based at least in part on the first image of the second 2D scale as acquired by the second camera at the first image acquisition time.

The method may further include determining metrology position coordinates of a first end tool position at the first image acquisition time based at least in part on the determined first relative positions of the first and second 2D scales. The method may further include operating the first camera to acquire a second image of the first 2D scale at a second image acquisition time; operating the second camera to acquire a second image of the second 2D scale at the second image acquisition time; determining a second relative position of the first 2D scale based at least in part on the second image of the first 2D scale as acquired by the first camera at the second image acquisition time; and determining a second relative position of the second 2D scale based at least in part on the second image of the second 2D scale as acquired by the second camera at the second image acquisition time. The method may further include determining the metrology position coordinates of a first end tool position at the first image acquisition time based at least in part on the determined first relative positions of the first and second 2D scales; and determining the metrology position coordinates of a second end tool position at the second image acquisition time based at least in part on the determined second relative positions of the first and second 2D scales. The method may further include utilizing the determined metrology position coordinates of the first and second end tool positions to determine a dimension that is related to a distance between the first and second end tool positions. The dimension may be a distance between first and second surface locations on a workpiece. A contact point of the end tool may contact the first surface location on the workpiece at the first image acquisition time and contact the second surface location on the workpiece at the second image acquisition time. The method may further include coupling the first and second 2D scales to the movable arm configuration at the first and second 2D scale coupling locations, respectively; coupling the first camera to the movable arm configuration at the first camera coupling location; and coupling the second camera to the movable arm configuration at the second camera coupling location.

Also disclosed is a supplementary metrology position determination system for use with a robot that includes a movable arm configuration with an end tool mounting configuration for mounting an end tool and a motion control system configured to control an end tool position of the end tool. The supplementary metrology position determination system may be summarized as including first and second two-dimensional (2D) scales, a first camera, a second camera, and a metrology processing portion. The first and second two-dimensional (2D) scales are configured to be coupled to the movable arm configuration of the robot at first and second 2D scale coupling locations, respectively. Each 2D scale includes a nominally planar substrate and a plurality of respective imageable features distributed on the planar substrate. The first camera is for acquiring an image of the first 2D scale at an image acquisition time. The first camera defines a first reference position and the first camera is configured to be coupled to the movable arm configuration at a first camera coupling location. The second camera is for acquiring an image of the second 2D scale at the image acquisition time. The second camera defines a second reference position and the second camera is configured to be coupled to the movable arm configuration at a second camera coupling location. The metrology processing portion is configured to determine a first relative position of the first 2D scale based at least in part on a first image of the first 2D scale as acquired by the first camera at a first image acquisition time, and determine a first relative position of the second 2D scale based at least in part on a first image of the second 2D scale as acquired by the second camera at the first image acquisition time. Metrology position coordinates of a first end tool position at the first image acquisition time are determined based at least in part on the determined first relative positions of the first and second 2D scales.

The first 2D scale coupling location may be on a first rotary joint of the movable arm configuration which has a first rotary axis and a motion transverse to the first rotary axis during rotation of the first rotary joint causes a change in the relative position of the first 2D scale. The metrology processing portion may be further configured to determine an angular orientation of the first 2D scale based at least in part on the first image of the first 2D scale as acquired by the first camera at the first image acquisition time. The first 2D scale coupling location may be on a first arm portion of the movable arm configuration and at least one of a bending or twisting of the first arm portion may cause a change in the relative position of the first 2D scale.

The supplementary metrology position determination system described herein may be added to an existing robot that already includes a measurement system (e.g., see block 140 of FIG. 1) with rotary encoders included in each of the robot rotary joints, which is able to provide a measurement/determination of where the end tool position is at the end of the robot arms, and which is referred to herein as a "robot accuracy", and for which the included encoders sometimes have limited/less accuracy than might be desired. The present invention is intended to provide a supplementary metrology system (e.g., that may be attached to an existing robot, with the additional cameras and scales attached to the robot arms), and which can provide improved accuracy for determining the end tool position at the end of the robot (i.e., at the end of the robot arms). More specifically, the encoders in the existing robot may only measure the rotations of the rotary joints, and for which the robot system/model may assume all of the joints rotate perfectly and that the arms stay perfectly straight. For any number of reasons, this may not be the case (e.g., the arms may be heavy which may cause bending/twisting of the arms/joints, the end tool placed at the end of the arm may be heavy, the joints may not rotate perfectly, etc.) for which there may "wobble" or "slop" in the movement of the joints (or other motion transverse to the expected joint/rotary axis), or some amount of bending/twisting of the arms, etc. The present invention adds cameras and 2D scales attached to the joints and/or robot arms, and for which the 2D scales are monitored/imaged by the cameras in order to detect both the usual rotary motions as well as the undesirable motions (e.g., wobble, slop, bending, twisting, etc.), and for which the determinations of the amount of the undesirable motions can be added to the calculation/model for determining the end tool position of the end tool at the end of the robot, with a better accuracy than if only the rotary encoders of the robot were utilized. In some implementations, such techniques may enable accuracies in the range of 10 microns or better to be achieved (e.g., as opposed to a 100 micron accuracy of certain prior robot systems). Such improved accuracy may be particularly desirable for certain applications (e.g., measurements of workpieces, precision drilling of holes in workpieces, precision manipulation and placement of very small workpieces or other elements, etc.).

BRIEF DESCRIPTION OF THE SEVERAL VIEWS OF THE DRAWINGS

FIG. 11 is a side view of a portion of a robot system;

DETAILED DESCRIPTION

Figure 1:
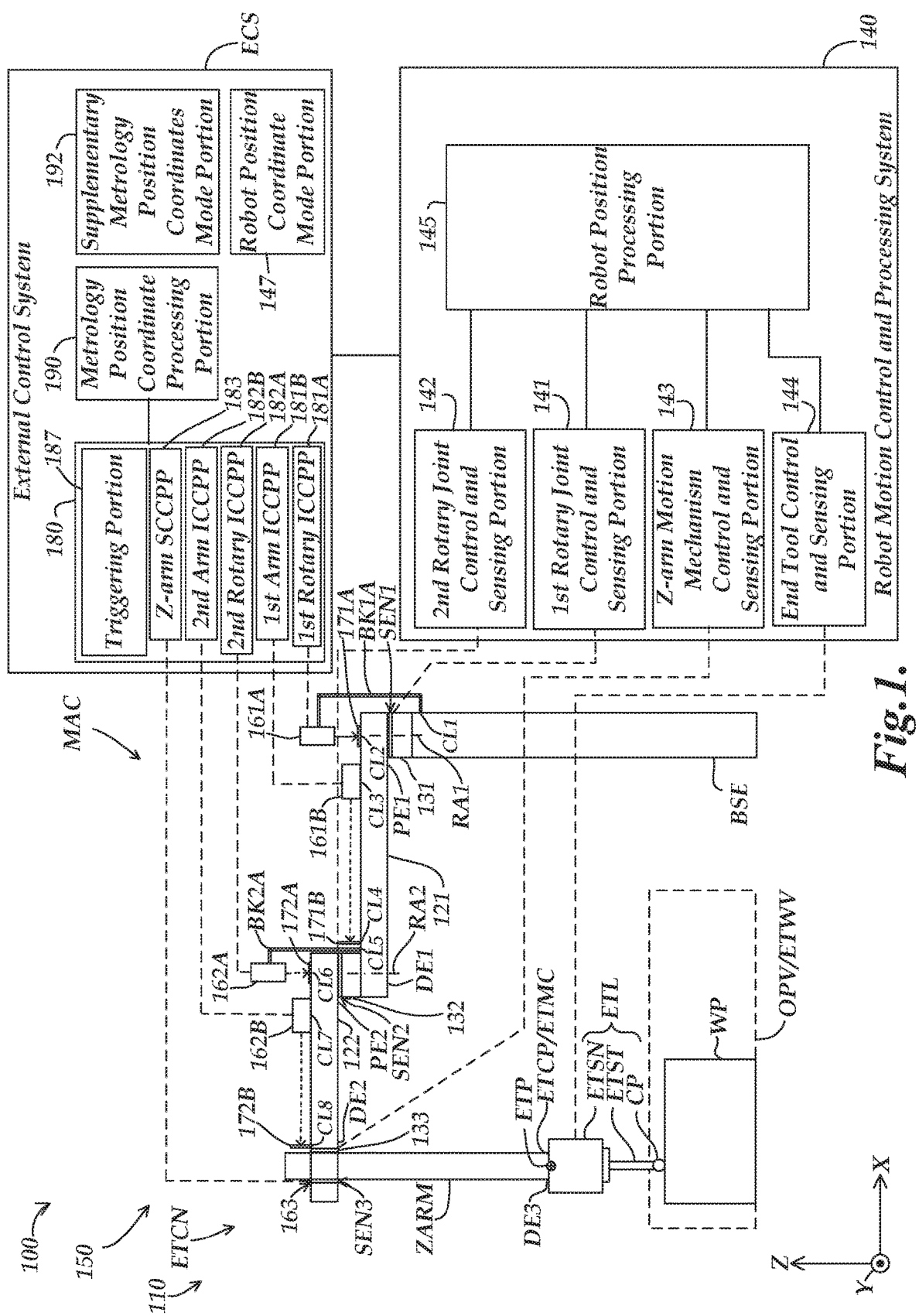
FIG. 1 is a block diagram of a first exemplary implementation of a robot system including an articulated robot and a supplementary metrology position determination system.

FIG. 1 is a block diagram of a first exemplary implementation of a robot system 100 including an articulated robot 110 and a supplementary metrology position determination system 150. The articulated robot 110 includes a movable arm configuration MAC and a robot motion control and processing system 140. In the example of FIG. 1, the movable arm configuration MAC includes first and second arm portions 121 and 122, first and second rotary joints 131 and 132 (e.g., included as part of first and second motion mechanisms), position sensors SEN1 and SEN2, and an end tool configuration ETCN. The first arm portion 121 is mounted to the first rotary joint 131 at a proximal end PE1 of the first arm portion 121. The first rotary joint 131 (e.g., located at an upper end of a supporting base portion BSE) has a rotary axis RA1 aligned along a z axis direction such that the first arm portion 121 is intended to nominally move about the first rotary joint 131 in an x-y plane that is perpendicular to the z axis. The second rotary joint 132 is located at a distal end DE1 of the first arm portion 121. The second rotary joint 132 has its rotary axis RA2 nominally aligned along the z axis direction. The second arm portion 122 is mounted to the second rotary joint 132 at a proximal end PE2 of the second arm portion 122, such that the second arm portion 122 is intended to nominally move about the second rotary joint 132 in an x-y plane that is nominally perpendicular to the z axis. In various implementations, the position sensors SEN1 and SEN2 (e.g., rotary encoders) may be utilized for determining the angular positions (i.e., in the x-y plane) of the first and second arm portions 121 and 122 about the first and second rotary joints 131 and 132, respectively.

In various implementations, the end tool configuration ETCN may include a Z-motion mechanism 133 (e.g., included as part of a third motion mechanism), a Z-arm portion ZARM (e.g., designated as a third arm portion), a position sensor SEN3 and an end tool coupling portion ETCP (e.g., included as part of an end tool mounting configuration ETMC) which couples to an end tool ETL. In various implementations, the end tool ETL may include an end tool sensing portion ETSN and an end tool stylus ETST with a contact point CP (e.g., for contacting a surface of a workpiece WP). The Z-motion mechanism 133 is located proximate to the distal end DE2 of the second arm portion 122. The Z-motion mechanism 133 (e.g., a linear actuator) is configured to move the Z-arm portion ZARM up and down in the z axis direction. In some implementations, the Z-arm portion ZARM may also be configured to rotate about an axis parallel to the z axis direction. In any case, the end tool ETL is coupled at the end tool coupling portion ETCP, and has a corresponding end tool position ETP with corresponding coordinates (e.g., x, y and z coordinates). In various implementations, the end tool position ETP may correspond to, or be proximate to, the distal end DE3 of the Z-arm portion ZARM (e.g., at or proximate to the end tool coupling portion ETCP).

The motion control system 140 of the robot is configured to control the end tool position ETP of the end tool ETL with a level of accuracy defined as a robot accuracy. More specifically, the motion control system 140 is generally configured to control the coordinates of the end tool position ETP with the robot accuracy based at least in part on sensing and controlling the angular positions (i.e., in the x-y plane) of the first and second arm portions 121 and 122 about the first and second rotary joints 131 and 132, respectively, using the position sensors SEN1 and SEN2. In various implementations, the motion control and processing system 140 may include first and second rotary joint control and sensing portions 141 and 142 that may receive signals from the position sensors SEN1 and SEN2, respectively, for sensing the angular positions of the first and second arm portions 121 and 122, and/or may provide control signals (e.g., to motors, etc.) in the first and second rotary joints 131 and 132 for rotating the first and second arm portions 121 and 122.

In general, the robot accuracy is related to certain assumptions about the movements of the robot (e.g., as may be related to a model, such as a kinematic and/or geometric model, etc., and/or corresponding calculations that are utilized for determining the end tool position). For example, in accordance with the robot accuracy, the determination of the end tool position may generally be based on the known lengths of the first and second arm portions 121 and 122, which are assumed to be level and straight and to not bend or twist, and the rotations about the first and second rotary joints 131 and 132, which are assumed to be precise, with centered rotary motion around each respective rotary axis of each rotary joint. However, in some instances certain arm portions may bend or twist, and/or some rotary joint motion may be transverse to the respective rotary axis. For example, there may be possible vertical displacement or sag at the distal ends DE1 and DE2 of the first and second arm portions 121 and 122, respectively (e.g., due to the weight and/or different orientations of the arm portions and/or end tool configuration, etc.) and/or there may be undesirable motion during the rotation about the first and/or second rotary joints 131 and 132 (e.g., motion transverse to the respective rotary axis). As will be described in more detail below, in accordance with principles disclosed herein, a higher accuracy for a determination of an end tool position or other robot motion/positioning may be achieved by utilizing a supplementary metrology position determination system that is able to determine, measure, and/or otherwise account for such undesirable motions (e.g., bending or twisting of arm portions, rotary joint motion transverse to a rotary axis, etc.). It will be appreciated that even small improvements in accuracy may be highly desirable for certain applications (e.g., for measurement and control operations of a robot, such as measurements of workpieces, precision drilling of holes in workpieces, etc.).

The motion control system 140 of the robot is also generally configured to control the z coordinate of the end tool position ETP with the robot accuracy based at least in part on sensing and controlling the linear position (i.e., along the z axis) of the Z-arm portion ZARM using the Z-motion mechanism 133 and the position sensor SEN3. In various implementations, the motion control and processing system 140 may include a Z-arm motion mechanism control and sensing portion 143 that may receive signals from the position sensor SEN3 for sensing the linear position of the Z-arm portion ZARM, and/or may provide control signals to the Z-motion mechanism 133 (e.g., a linear actuator) to control the z position of the Z-arm portion ZARM. As will be described in more detail below, in some implementations the supplementary metrology position determination system 150 may include a corresponding position sensor 163, which may provide similar information and may operate similarly as the position sensor SEN3 (e.g., or which may operate differently and/or may be a higher accuracy sensor than the position sensor SEN3). In some implementations, the supplementary metrology position determination system 150 may not include a corresponding position sensor 163 and may instead utilized the sensed data from the position sensor SEN3 which is sent to the supplementary metrology position determination system 150. In some implementations, the supplementary metrology position determination system 150 may provide other sensed position information (e.g., regarding relative positions of the arm portions 121 and 122 and/or rotary joints 131 and 132) to the motion control and processing system 140 for more accurately determining an end tool position.

The motion control and processing system 140 and/or supplementary metrology position determination system 150 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may be utilized for contacting or otherwise sensing surface locations/positions/points on a workpiece WP, for which various corresponding signals may be received, determined and/or processed by the end tool sensing portion ETSN which may provide corresponding signals to the motion control and processing system 140 and/or supplementary metrology position determination system 150. In various implementations, the motion control and processing system 140 and/or supplementary metrology position determination system 150 may include an end tool control and sensing portion 144 that may provide control signals to and/or receive sensing signals from the end tool sensing portion ETSN. In various implementations, the end tool control and sensing portion 144 and the end tool sensing portion ETSN may be merged and/or indistinguishable. In various implementations, the first and second rotary joint control and sensing portions 141 and 142, the Z-motion mechanism control and sensing portion 143, and the end tool control and sensing portion 144 may all provide outputs to and/or receive control signals from a robot position processing portion 145 which may control and/or determine the overall positioning of the articulated robot 110 and corresponding end tool position ETP as part of the robot motion control and processing system 140. In various implementations, the articulated robot 110 may have a designated operable work volume OPV, which may also or alternatively be designated as an end tool working volume ETWV, in which at least a portion of the end tool (e.g., the contact point CP) may be moved (e.g., for measuring/inspecting a workpiece, etc.).

In the configuration of FIG. 1, the robot 110 is configured to move the movable arm configuration MAC so as to move at least a portion of the end tool ETL that is mounted to the end tool mounting configuration ETMC along at least two dimensions in the end tool working volume ETWV. The motion control system 140 is configured to control the end tool position ETP with a level of accuracy defined as the robot accuracy, based at least in part on sensing and controlling the position of the movable arm configuration MAC (e.g., using one or more position sensors included in the robot 110).

In various implementations, the supplementary metrology position determination system 150 may be included with or otherwise added to an articulated robot 110 (e.g., as part of a retrofit configuration for being added to an existing articulated robot 110, etc.) In general, the supplementary metrology position determination system 150 may be utilized to provide an improved level of accuracy for the determination of the end tool position ETP. More specifically, as will be described in more detail below, the supplementary metrology position determination system 150 may be utilized to determine relative positions that are indicative of, and may be utilized to determine, the metrology position coordinates of the end tool position ETP, with an accuracy level that is better than the robot accuracy.

Figure 2:
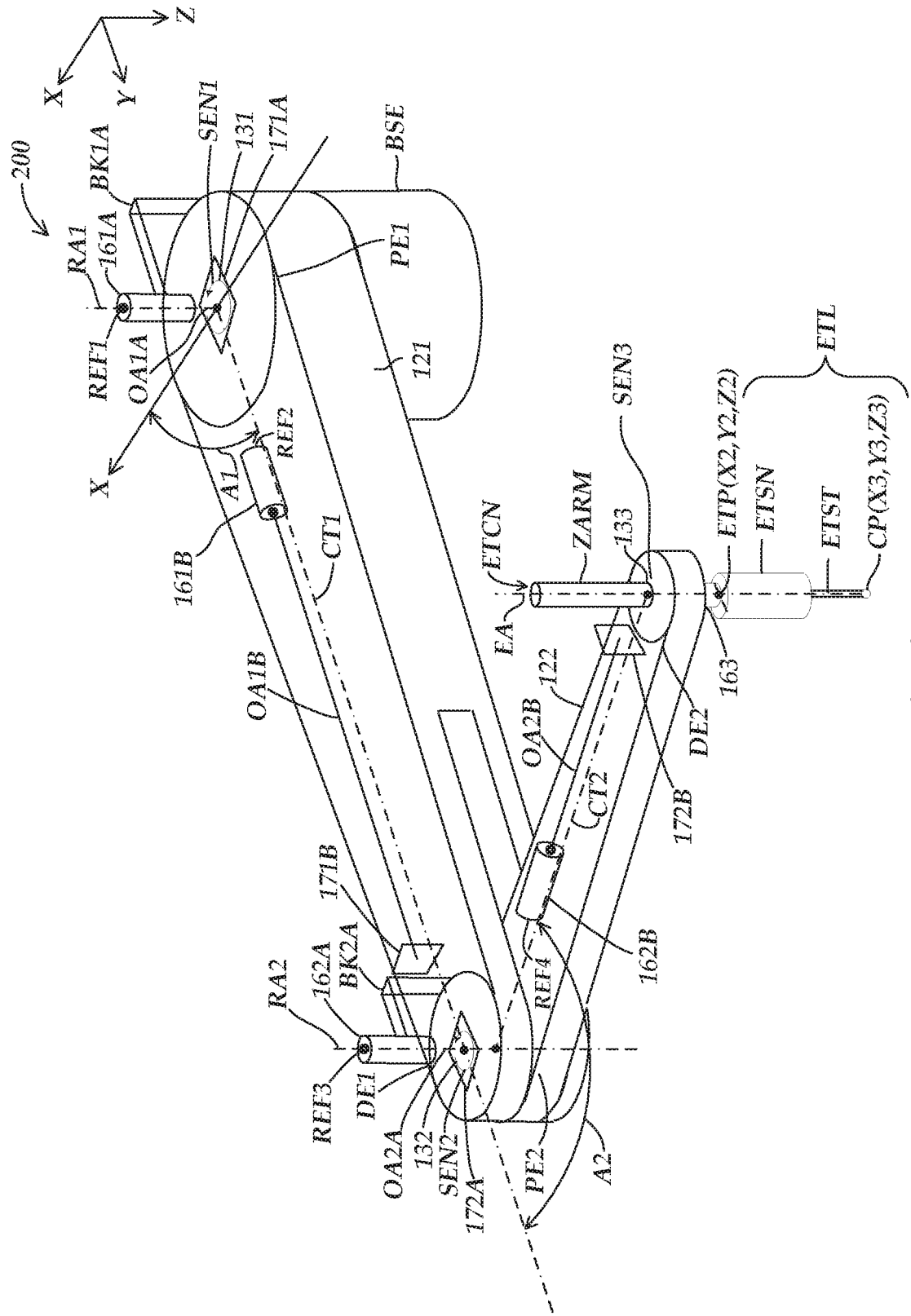
FIG. 2 is an isometric diagram of a second exemplary implementation of a robot system similar to the robot system of FIG. 1.

As illustrated in FIG. 1, the supplementary metrology position determination system 150 may include cameras 161A, 161B, 162A, 162B, a sensor 163, scales 171A, 171B, 172A, 172B, and a metrology position coordinate processing portion 190. As illustrated in FIGS. 1 and 2 (i.e., for which the configuration of FIG. 2 will be described in more detail below), the cameras/scales are arranged as four camera/scale sets, including the cameras 161A, 161B, 162A and 162B, each directed at a corresponding scale 171A, 171B, 172A and 172B. The scales 171A and 172A are on rotary joints of the robot 110, and the scales 171B and 172B are on arm portions of the robot 110. Each of the cameras 161A, 161B, 162A and 162B and scales 171A, 171B, 172A and 172B is coupled to the robot 110 at a respective coupling location CL1-CL8. More specifically, the camera 161A is coupled to a mounting bracket BK1A, which is coupled to the supporting base portion BSE at a camera coupling location CL1. The scale 171A is coupled to the first rotary joint 131 at a 2D scale coupling location CL2, which corresponds to the rotary axis RA1 of the first rotary joint 131. The camera 161B is coupled to the first arm portion 121 at a camera coupling location CL3. The scale 171B is coupled to the first arm portion 121 at a 2D scale coupling location CL4, which is proximate to the second rotary joint 132. The camera 162A is coupled to a mounting bracket BK2A, which is coupled to the first arm portion 121 at a camera coupling location CL5. The scale 172A is coupled to the second rotary joint 132 at a 2D scale coupling location CL6, which corresponds to the rotary axis RA2 of the second rotary joint 132. The camera 162B is coupled to the second arm portion 122 at a camera coupling location CL7. The scale 172B is coupled to the second arm portion 122 at a 2D scale coupling location CL8, which is proximate to the Z-arm portion ZARM. In various implementations, the coupling of each of the various components may be achieved utilizing one or more coupling components, elements, mechanisms and/or techniques (e.g., such as fastening elements, bolts, clamps, adhesive glue, etc.)

As illustrated in FIGS. 1 and 2 (i.e., for which the configuration of FIG. 2 will be described in more detail below), in various implementations the camera 161A defines a reference position REF1 and an optical axis OA1A of the camera 161A is aligned with the rotary axis RA1 of the first rotary joint 131, and features of the scale 171A are imageable by the camera 161A. The camera 161B defines a reference position REF2 and an optical axis OA1B of the camera 161B is aligned with a portion (e.g., center portion) of the scale 171B, and features of the scale 171B are imageable by the camera 161B. The camera 162A defines a reference position REF3 and an optical axis OA2A of the camera 162A is aligned with the rotary axis RA2 of the second rotary joint 132, and features of the scale 172A are imageable by the camera 162A. The camera 162B defines a reference position REF4 and an optical axis OA2B of the camera 162B is aligned with a portion (e.g., center portion) of the scale 172B, and features of the scale 172B are imageable by the camera 162B.

Each of the four cameras 161A, 161B, 162A and 162B is controlled by and provides image signals to a respective imaging configuration control and processing portion (ICCPP) 181A, 181B, 182A and 182B. A triggering portion 187 may in some instances coordinate the triggering of all of the cameras 161A, 161B, 162A and 162B to obtain an image at the same time (e.g., as corresponding to a position of the robot 110 at a particular moment in time for determining the end tool position at the end of the robot 110 at that time). In implementations where a position sensor 163 is included (e.g., for sensing the position of the Z-arm portion ZARM), such may be controlled by and provide position signals to a sensing configuration control and processing portion (SCCPP) 183, for which collection and/or recording of position data may in some implementations be triggered by the signal from the triggering portion 187.

In various implementations, each of the 2D scales 171A, 171B, 172A and 172B comprises a nominally planar substrate SUB and a plurality of respective imageable features that are distributed on the substrate SUB. The respective imageable features are located at respective known local x and y scale coordinates on each 2D scale. In various implementations, each 2D scale may be an incremental or absolute scale, as will be described in more detail below with respect to FIGS. 5-7.

In various implementations, the triggering portion 187 and/or the metrology position coordinate processing portion 190 may be included as part of an external control system ECS (e.g., as part of an external computer, etc.) The triggering portion 187 may be included as part of an imaging and sensing configuration control and processing portion 180. In various implementations, the triggering portion 187 is configured to input at least one input signal that is related to the end tool position ETP and to determine the timing of a first trigger signal based on the at least one input signal, and to output the first trigger signal to the cameras 161A, 161B, 162A and 162B and the position sensor 163. In various implementations, each of the cameras 161A, 161B, 162A and 162B is configured to acquire a digital image of the corresponding 2D scale 171A, 171B, 172A and 172B, respectively, at an image acquisition time in response to receiving the first trigger signal. In various implementations, the metrology position coordinate processing portion 190 is configured to input the acquired images and to identify at least one respective imageable feature included in each acquired image of the 2D scales and a related respective known 2D scale coordinate location. In various implementations, the external control system ECS may also include a standard robot position coordinates mode portion 147 and a supplementary metrology position coordinates mode portion 192, for implementing corresponding modes, as will be described in more detail below.

In various implementations, each imaging configuration control and processing portion 181A, 181B, 182A and 182B may include a component (e.g., a subcircuit, routine, etc.) that activates an image integration of the corresponding camera 161A, 161B, 162A and 162B periodically (e.g., at a set timing interval) for which the first trigger signal may activate a strobe light timing (e.g., for which each camera 161A, 161B, 162A and 162B may include a strobe light) or other mechanism to effectively freeze motion and correspondingly determine an exposure within the integration period. In such implementations, if no first trigger signal is received during the integration period, a resulting image may be discarded, wherein if a first trigger signal is received during the integration period, the resulting image may be saved and/or otherwise processed/analyzed to determine a relative position, as will be described in more detail below.

In various implementations, different types of end tools ETL may provide different types of outputs that may be utilized with respect to the triggering portion 187. For example, in an implementation where the end tool ETL is a touch probe that is used for measuring a workpiece and that outputs a touch signal when it touches the workpiece, the triggering portion 187 may be configured to input that touch signal, or a signal derived therefrom, as the at least one input signal that the timing of a first trigger signal is determined based on. As another example, in an implementation where the end tool ETL is a scanning probe that is used for measuring a workpiece and that provides respective workpiece measurement sample data corresponding to a respective sample timing signal, the triggering portion 187 may be configured to input that respective sample timing signal, or a signal derived therefrom, as the at least one input signal. As another example, in an implementation where the end tool ETL is a camera that is used to provide a respective workpiece measurement image corresponding to a respective workpiece image acquisition signal, the triggering portion 187 may be configured to input that workpiece image acquisition signal, or a signal derived therefrom, as the at least one input signal.

In the example implementation of FIG. 1, the supplementary metrology position determination system 150 is configured such that the metrology position coordinate processing portion 190 is operable to determine a relative position (e.g., including local x and y scale coordinates, which may indicate the scale orientation, location, etc.) between each 2D scale 171A, 171B, 172A and 172B and the corresponding reference position REF1, REF2, REF3, REF4 of the corresponding camera 161A, 161B, 162A and 162B, (e.g., based on determining an image position of the identified at least one respective imageable feature in each acquired image). The determined relative positions may be utilized to determine the metrology position coordinates of the end tool position ETP at the image acquisition time, with an accuracy level that is better than the robot accuracy. In various implementations, the supplementary metrology position determination system 150 may be configured to determine the metrology position coordinates of the end tool position ETP at the image acquisition time, based at least in part on the determined relative positions.

As noted above, the robot accuracy may be related to a model (e.g., kinematic, geometric, etc.) and/or corresponding calculations or other processes that are utilized for determining the end tool position. In accordance with such robot processes, the determination of the end tool position may generally be based on the known lengths of the first and second arm portions 121 and 122, which are assumed to be level and straight and to not bend or twist, and the rotation about the first and second rotary joints 131 and 132, which is assumed to be precise, with centered rotary motion around each respective rotary axis of each rotary joint. When there are undesirable movements (e.g., bending or twisting of the arm portions, rotary joint motion transverse to the respective rotary axis, etc.) the robot determination of the end tool position may be inaccurate. In accordance with principles disclosed herein, by utilizing the supplementary metrology position determination system 150 that is able to determine, measure, and/or otherwise account for such undesirable motions (e.g., bending or twisting of arm portions, rotary joint motion transverse to a rotary axis, etc.) a higher accuracy for a determination of an end tool position and/or other robot motion/positioning may be achieved. For example, with regard to an example kinematic and/or geometric model that is assumed by the robot system (e.g., with straight robot arms of specified lengths and perfect rotation), by determining/adding additional measured information to such a model, more accurate position information can be determined. For example, rather than assuming each of the first and second arm portions 121 and 122 are straight, the respective camera/scale combinations 161B/171B (for the first arm portion 121) and 1626/172B (for the second arm portion 122) may provide position information/measurements that represent any bending, twisting, etc. of the arm portions 121 and 122. Similarly, rather than assuming that the rotary motion about each of the rotary joints 131 and 132 is perfect, the respective camera/scale combinations 161A/171A (for the first rotary joint 131) and 162A/172A (for the second rotary 132) may provide position information/measurements that represent any rotary joint motion transverse to the respective rotary axis (as well as providing position information/measurements indicating the more standard angular orientation of the respective 2D scale with a high level of accuracy). By including such information (e.g., as part of a kinematic and/or geometric model, calculations, etc.) for determining the positions of the robot arms and/or the end tool position (e.g., at a distal end of the movable arm configuration MAC), etc., a higher level of accuracy may be achieved.

In certain implementations, the supplementary metrology position determination system 150 may operate relatively independently (e.g., from the robot processing portion 145) for the higher accuracy determinations (e.g., of the end tool position, etc.) In other implementations, the supplementary metrology position determination system 150 may operate in conjunction (e.g., with the robot processing portion 145 and/or control and sensing portions or other portions of the robot and/or other systems) for achieving the higher accuracy determinations. For example, the supplementary metrology position determination system 150 may receive certain information from the robot system (e.g., from the robot position processing portion, or control and sensing portions, or otherwise) for combining, supplementing and/or adding to determined position information (e.g., for determining an end tool position, etc.) As another example, the supplementary metrology position determination system 150 may provide certain information to the robot system, or other system that may combine certain position information from the robot and supplementary systems, for combining, supplementing and/or adding to determined position information (e.g., for determining an end tool position, etc.).

It will be appreciated that such a system may have certain advantages over various alternative systems. For example, in various implementations a system such as that disclosed herein may be smaller and/or less expensive than alternative systems utilizing technologies such as laser trackers or photogrammetry for tracking robot movement/positions, and may also have higher accuracy in some implementations. The disclosed system also does not take up or obscure any part of the operable work volume OPV, such as alternative systems that may include a scale or fiducial on the ground or stage, or otherwise in the same area (e.g., operable work volume) where workpieces may otherwise be worked on and/or inspected, etc. In addition, in various implementations by having all of the cameras and scales coupled to the robot (e.g., including as coupled to moving portions of the movable arm configuration such as arm portions and rotary joints), no external structure or external coupling in the robot environment needs to be provided for the cameras or scales.

FIG. 2 is an isometric diagram of a second exemplary implementation of a robot system 200 substantially similar to the robot system 100 of FIG. 1. It will be appreciated that certain numbered components (e.g., 1XX or 2XX) of FIG. 2 may correspond to and/or have similar operations as identically or similarly numbered counterpart components (e.g., 1XX) of FIG. 1, and may be understood to be similar or identical thereto and may otherwise be understood by analogy thereto and as otherwise described below. This numbering scheme to indicate elements having analogous and/or identical design and/or function is also applied to other figures described below.

In the configuration of FIG. 2 (i.e., similar to the configuration of FIG. 1), the supplementary metrology position determination system 150 includes the cameras 161A, 161B, 162A and 162B, each directed at the corresponding scales 171A, 171B, 172A and 172B, and each attached to the respective arm portions 121 and 122, rotary joints 131 and 132, etc. In various implementations, different reference axes and lines may be designated for referencing certain movements, coordinates and angles of the components of the articulated robot. For example, the first and second arm portions 121 and 122 may each have designated nominally horizontal center lines CT1 and CT2, respectively, passing down the centers of the respective arm portions.

In various implementations, the end tool configuration ETCN may be coupled to the second arm portion 122 proximate to the distal end DE2 of the second arm portion 122 and may be designated as having an end tool axis EA of the end tool ETL that nominally intersects the center line CT2 of the second arm portion 122. The end tool position ETP may be designated as having coordinates of X2, Y2, Z2. In various implementations, the end tool ETL may have a contact point CP (e.g., at the end of an end tool stylus ETST for contacting a workpiece) which may be designated as having coordinates X3, Y3, Z3. In an implementation where the contact point CP of the end tool ETL does not vary in the x or y directions relative to the rest of the end tool, the X3 and Y3 coordinates may in some instances be nominally equal to the X2 and Y2 coordinates, respectively. It will be appreciated that in instances where there may be determinations of bending or twisting of arm portions 121 and 122 (i.e., in accordance with principles disclosed herein) the resulting model (e.g., kinematic, geometric, etc.) may indicate that the X3 and Y3 coordinates are different than the X2 and Y2 coordinates. For example, the bent or twisted arm portions may result in a corresponding tilt etc. of the end tool ETL, for which the measurement/determination of the amount of bending/twisting can be included in the model for determining a more accurate indication of the coordinates X3 and Y3 relative to the coordinates X2 and Y2, etc.

In one specific example implementation, each acquired image of the respective cameras 161A, 161B, 162A and 162B may be analyzed by the metrology position coordinate processing portion 190 to determine a relative position (e.g., corresponding to a location, orientation, etc. of the respective scale 171A, 171B, 172A and 172B). Such determinations may be made in accordance with standard camera/scale image processing techniques (e.g., for determining a location, orientation, etc. of camera relative to a scale). Various examples of such techniques are described in U.S. Pat. Nos. 6,781,694; 6,937,349; 5,798,947; 6,222,940; and 6,640,008, each of which is hereby incorporated herein by reference in its entirety. In various implementations, such techniques may be utilized to determine the location of a field of view (e.g., as corresponding to a position of a camera) within a scale range (e.g., within each 2D scale 171A, 171B, 172A and 172B), as will be described in more detail below with respect to FIGS. 5-7. In various implementations, such a determination may include identifying at least one respective imageable feature included in the acquired image of the respective 2D scale and the related respective known 2D scale coordinate location. Such a determination may correspond to determining a relative position between the respective 2D scale 171A, 171B, 172A and 172B and the corresponding reference position REF1, REF2, REF3 and REF4 (e.g., as corresponding to and/or indicative of the position of the corresponding camera 161A, 161B, 162A and 162B).

Figure 3:
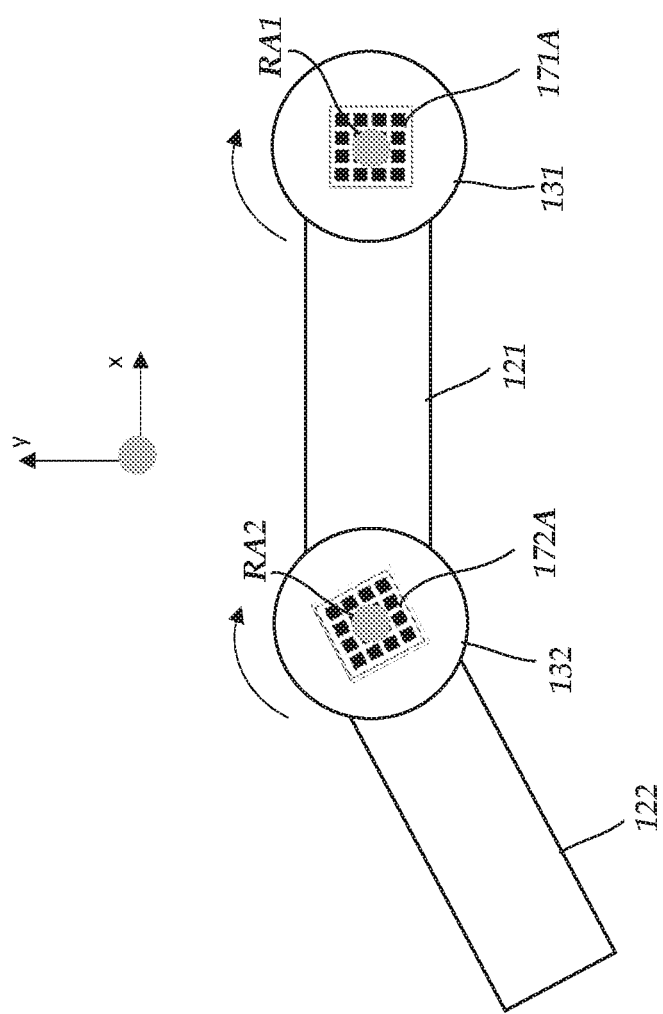
FIG. 3 is a top view of a portion of a robot system.

FIG. 3 is a top view of a portion of a robot system similar to that shown in FIGS. 1 and 2. More specifically, FIG. 3 shows a top view of the first and second arm portions 121 and 122, the first and second rotary joints 131 and 132, and the scales 171A and 172A. The scale 171A is coupled at a 2D scale coupling location that is on the first rotary joint 131, and the scale 172A is coupled at a 2D scale coupling location that is on the second rotary joint 132. A motion transverse to the rotary axis RA1 during rotation of the rotary joint 131 causes a change in the relative position of the scale 171A (e.g., in the x-axis and/or y-axis directions of the local camera coordinate system), and a motion transverse to the rotary axis RA2 during rotation of the rotary joint 132 causes a change in the relative position of the scale 172A (e.g., in the x-axis and/or y-axis directions of the local camera coordinate system). As described above, the cameras 161A and 162A are positioned such that they can obtain images of the scales 171A and 172A, respectively. Based on those images, the metrology position coordinate processing portion 190 determines the respective angular orientations of the scales 171A and 172A, and also determines relative positions of the scales 171A and 172A (e.g., in terms of the x-axis and y-axis coordinates of the local camera coordinate system which may be referenced to a reference position REF as may be defined by the camera as described above) which the metrology position coordinate processing portion 190 uses to detect possible undesirable motion transverse to the respective rotary axis RA1 and RA2. In various implementations, the metrology position coordinate processing portion 190 may utilize the determined relative positions of the scales 171A and 172A to detect so-called "wobble", "slop" or other motion of the first and second rotary joints 131 and 132 that the regular robot encoders would not normally detect or account for and would thus result in measurement errors in relation to determining the end tool position at the end of the robot arm.

In various implementations, the supplementary metrology position determination system 150 is "self-contained" in that it does not obtain the rotary information from the robot encoders for the first and second rotary joints 131 and 132. Instead, the supplementary metrology position determination system 150 obtains images of the scales 171A and 172A, and determines rotary information (e.g., angular orientations) of the first and second rotary joints 131 and 132. The supplementary metrology position determination system 150 also determines relative positions/displacement of the first and second rotary joints 131 and 132. The rotary information (e.g., angular orientations) of the first and second rotary joints 131 and 132 determined by supplementary metrology position determination system 150 in various implementations may typically be more accurate than the angular orientations of the first and second rotary joints 131 and 132 determined by robot encoders included in those rotary joints.

Figure 4:
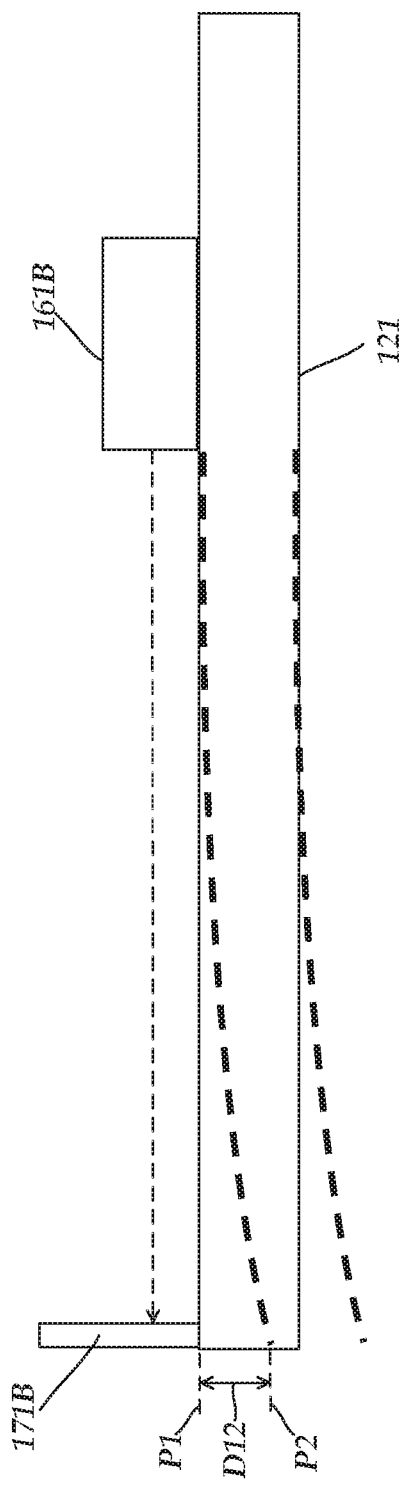
FIG. 4 is a side view of a portion of a robot system.

FIG. 4 is a side view of a portion of a robot system similar to that shown in FIGS. 1 and 2. More specifically, FIG. 4 shows a side view of the first arm portion 121, the camera 161B, and the scale 171B. Although not shown in FIG. 4, the scale 171B is positioned near the second rotary joint 132 that is coupled to the second arm portion 122 (e.g., see FIG. 2). The first arm portion 121, second arm portion 122 and/or an end tool coupled to the second arm portion 122 and/or other elements may be sufficiently heavy to cause bending or twisting of the first arm portion 121, as shown by dashed lines in FIG. 4. Such bending or twisting may cause a change in a relative position of the scale 171B, wherein a lower portion of the scale 171B moves from an expected position P1 to a bent position P2. A corresponding amount of movement/position change D12 can be detected/measured in accordance with the movement of the scale 171B relative to the camera 161B. More specifically, when the arm 121 is bent as illustrated, the field of view of the camera 161B will show a different portion of the scale 171B (e.g., closer to the top of the scale 171B in the illustrated orientation), for which that image can be analyzed to determine the position of the scale 171B and the corresponding amount of bending of the first arm portion 121 (e.g., based at least in part on determinations of different positions of one or more imageable features of the scale in the different images etc.)

Figure 5:
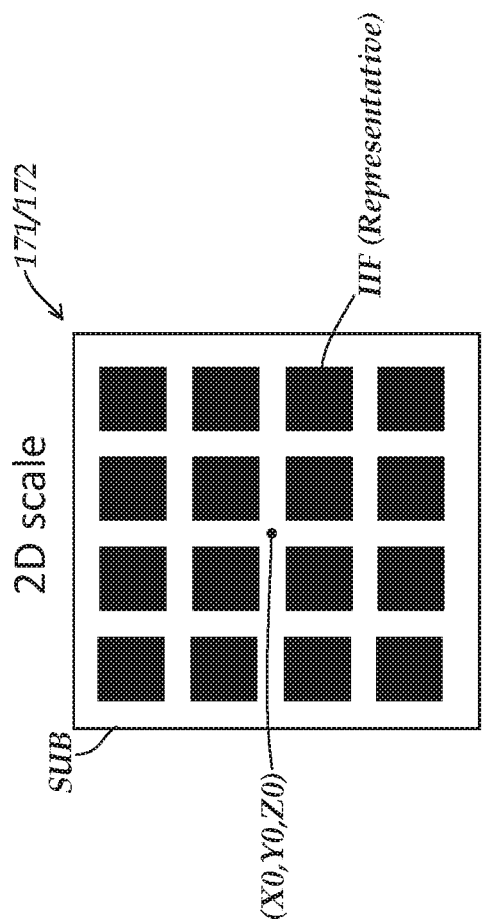
FIG. 5 is an isometric diagram of a first exemplary implementation of an incremental 2D scale.
Figure 6:
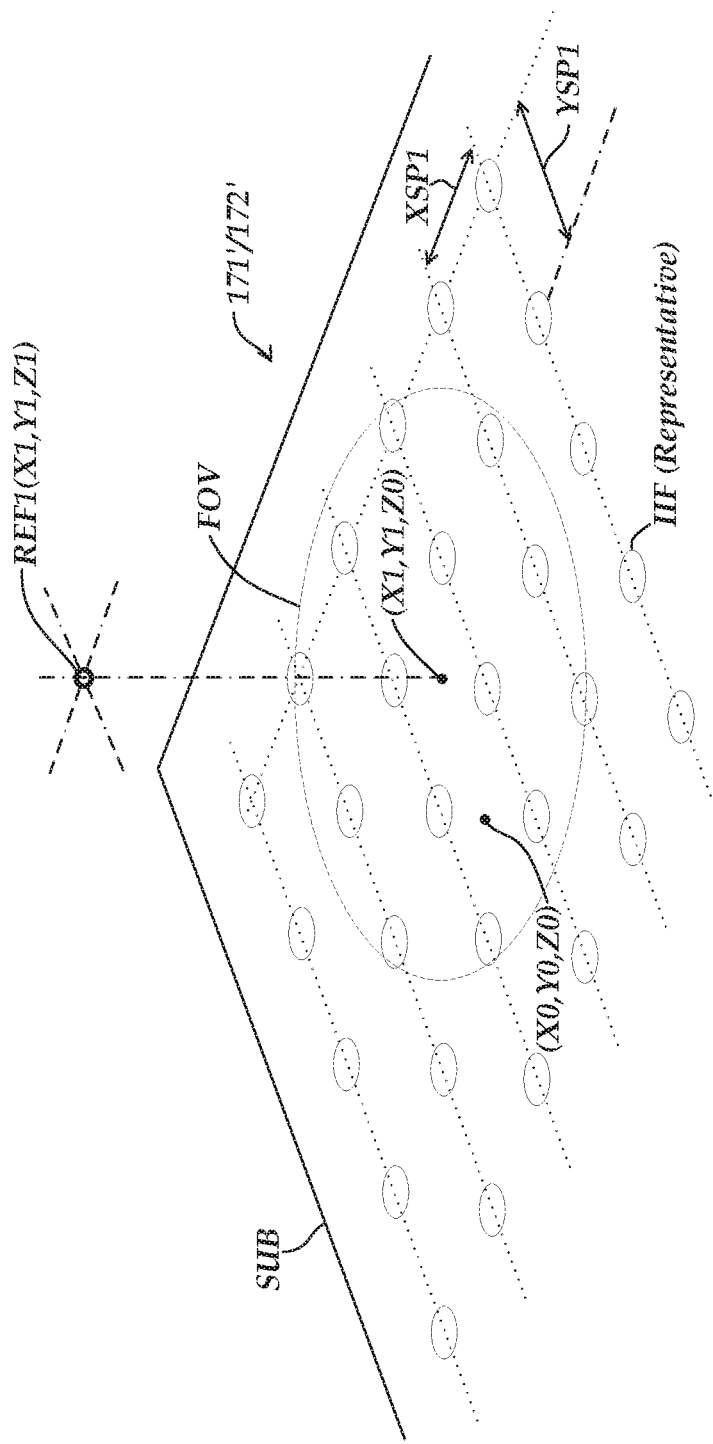
FIG. 6 is an isometric diagram of a second exemplary implementation of an incremental 2D scale.
Figure 7:
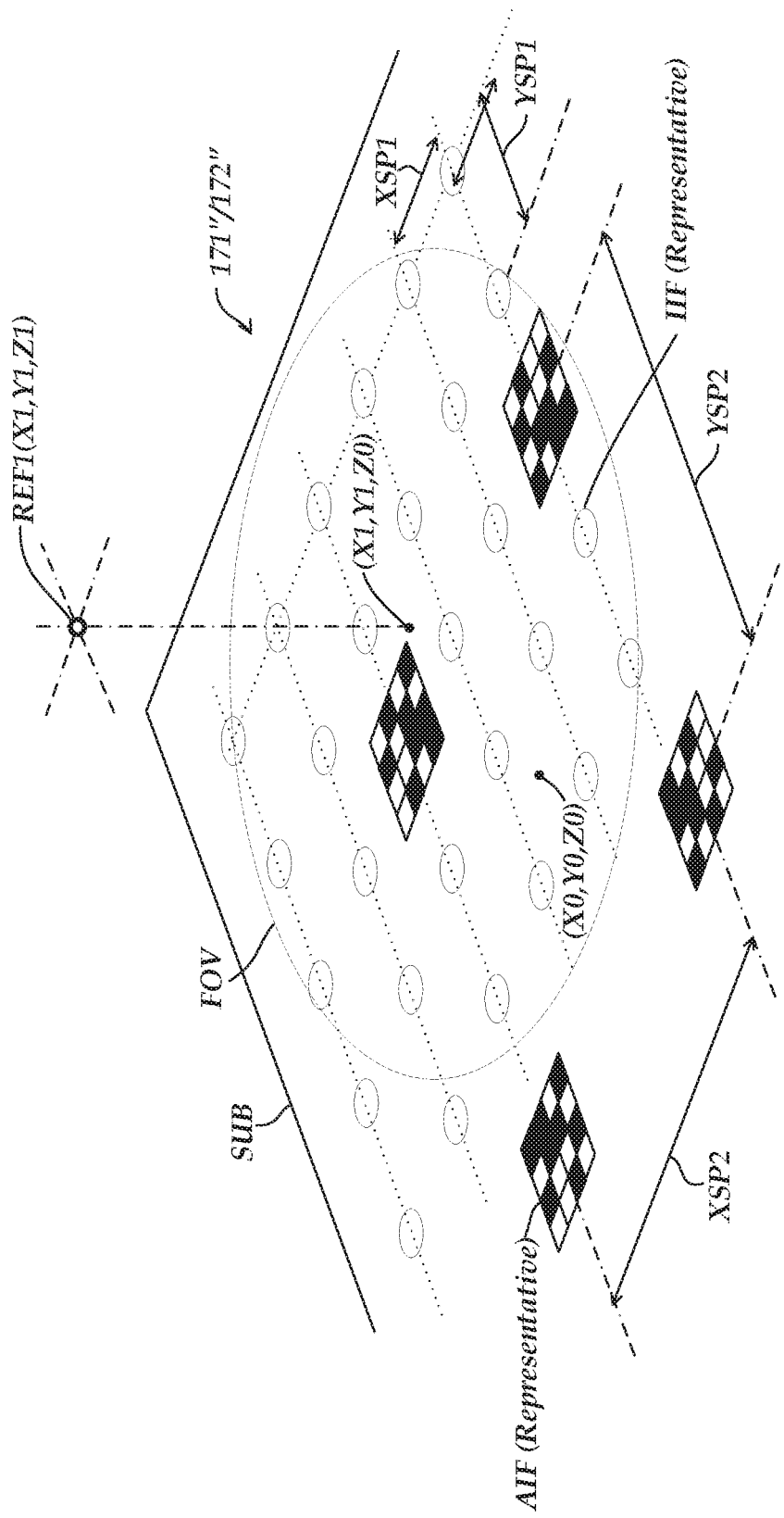
FIG. 7 is an isometric diagram of an exemplary implementation of an absolute 2D scale.

FIG. 5 is a diagram of an exemplary implementation of an incremental 2D scale 171/172, FIG. 6 is an isometric diagram of an exemplary implementation of an incremental 2D scale 171'/172', and FIG. 7 is an exemplary implementation of an absolute 2D scale 171"/172". In various implementations, any of the 2D scales 171/172, 171'/172', or 171"/172" may be utilized for or otherwise representative of any of the 2D scales 171A, 171B, 172A and 172B of FIGS. 1 and 2, and/or any of the 2D scales 871A, 871B, 872A, 872B, 873A, 873B, and 874A of FIGS. 8 and 9, as will be described in more detail below.

As illustrated in FIG. 5, the incremental 2D scale 171/172 includes an array of evenly spaced incremental imageable features IIF distributed on a planar substrate SUB. In various implementations, the incremental 2D scale 171/172 may have a specified periodicity (e.g., smaller than 100 microns for which periodic spacings between the incremental imageable features IIF along the respective x and y axes may each be less than 100 microns, as will be described in more detail below with respect to the example of FIG. 6). In one specific example implementation, the 2D scale 171/172 may be designated as having a reference position (e.g., an origin location) at scale coordinates X0, Y0, Z0, as will also be described in more detail below with respect to the example of FIG. 6.

FIG. 6 is an isometric diagram of an exemplary implementation of an incremental 2D scale 171'/172'. As illustrated in FIG. 6, the incremental 2D scale 171'/172' includes an array of evenly spaced incremental imageable features IIF distributed on a planar substrate SUB'. In various implementations, the incremental 2D scale 171'/172' may have a periodicity that is smaller than 100 microns (e.g., for which periodic spacings XSP1 and YSP1 between the incremental imageable features IIF along the respective x and y axes may each be less than 100 microns). In various implementations, the position information that is determined utilizing the incremental 2D scale 171'/172' may have an accuracy of at least 10 microns. In contrast to a robot accuracy that may be approximately 100 microns in certain implementations, the accuracy determined utilizing such 2D scales may be at least 10× that of the robot accuracy. In one specific example implementation, the incremental 2D scale 171'/172' may have an even higher periodicity of approximately 10 microns, for which, if the magnification of the respective camera is approximately 1× and interpolation is performed by a factor of 10×, an approximately 1 micron accuracy may be achieved.

In various implementations, a location of a field of view FOV of the respective camera (e.g., camera 161A, 161B, etc.) within the incremental 2D scale 171'/172' may provide an indication of a relative position between the 2D scale 171'/172' and the corresponding reference position (e.g., reference position REF1, REF2, etc.) In various implementations, the respective camera (e.g., camera 161A, 161B, etc.) may be utilized in combination with the incremental 2D scale 171'/172' as part of a camera/scale image processing configuration. For example, the metrology position coordinate processing portion 190 may determine a relative incremental position between the 2D scale 171'/172' and the corresponding reference position (e.g., reference position REF1 which corresponds to and/or is indicative of a position of the corresponding camera 161A) based on the location of the field of view FOV within the incremental 2D scale 171'/172', as indicated by the portion and orientation of the 2D scale 171'/172' (e.g., in accordance with the position and orientation of one or more of the imageable features IFF) in the acquired image (e.g., which may indicate the location, orientation, etc. of the 2D scale 171'/172' relative to the respective camera and reference position), and as is known in the art for camera/scale image processing techniques (e.g., as described in the previously incorporated references). In various implementations, the incremental 2D scale 171'/172' may be of various sizes relative to the field of view FOV (e.g., the incremental 2D scale 171'/172' may be larger than the FOV so that when the 2D scale is moved relative to the respective camera, the captured image will still be filled by a portion of the 2D scale, and for which the 2D scale may be at least 2×, 4×, etc. larger than the field of view FOV).

In various implementations, the incremental position indicated by the 2D scale 171'/172' may be combined with position information from other 2D scales, other sensors, and/or the articulated robot 110 to determine a relatively precise and/or absolute position (e.g., of the end tool). For example, the sensors SEN1 and SEN2 (e.g., rotary encoders) of the articulated robot 110 may indicate the end tool position ETP with the robot accuracy, for which the incremental positions indicated by the 2D scales 171'/172' (e.g., 2D scales 171A, 171B, 172A and 172B) may be utilized to determine and/or further refine the determined end tool position ETP to have an accuracy that is better than the robot accuracy. In one such configuration, the metrology position coordinate processing portion 190 may be configured to identify one or more respective imageable features IIF included in each acquired image of each 2D scale 171'/172' and determine the image positions of the one or more imageable features IFF in the acquired images.

As described above with respect to FIG. 2, in one specific example implementation, the 2D scale 171'/172' may be designated as having a reference position (e.g., an origin location) at X0, Y0, Z0 (e.g., which for an origin location may have values of 0,0,0), in accordance with a local scale coordinate system (e.g., as may be related to a corresponding local camera coordinate system, and as may be contrasted with a robot coordinate system, although for which conversions may be made between the various coordinate systems). In such a configuration, the reference location (e.g., reference location REF1) may be at relative coordinates of X1, Y1, Z1, and a center of a corresponding field of view FOV (e.g., as captured in an acquired image) may be at relative coordinates of X1, Y1, Z0. In various implementations, in the scale coordinate system, all coordinates on the 2D scale may have Z positions of Z0, while the corresponding reference location (e.g., reference location REF1 which may correspond to and/or indicate the location of the camera 161A) may have a different relative Z location relative to the 2D scale, with a corresponding Z position of Z1. In various implementations, the center of the field of view FOV at the coordinates X1, Y1 may be along the optical axis (e.g., optical axis OA1) of the respective camera (e.g., camera 161A), which in some configurations may be assumed to be nominally perpendicular to the 2D scale, and for which the reference location REF1 may also be along the optical axis, thus having the same XY coordinates of X1, Y1 as the center of the field of view FOV.

In operation, an acquired image may be analyzed by the metrology position coordinate processing portion 190 to determine the X1, Y1 coordinates corresponding to the center of the field of view FOV of the respective camera. In various implementations, such a determination may be made in accordance with standard camera/scale image processing techniques, for determining a location of a field of view (e.g., corresponding to a location of a camera) within a scale range (e.g., within the 2D scale 171'/172'). It will be appreciated that in accordance with standard camera/scale image processing techniques, the reference position/origin location X0, Y0, Z0 is not required to be in the field of view FOV for such a determination to be made (i.e., the relative position may be determined from the scale information at any location along the 2D scale 171'/172', as provided in part by the scale elements comprising the evenly spaced incremental imageable features IIF). In various implementations, such a determination may include identifying at least one respective imageable feature included in the acquired image of the 2D scale and the related respective known 2D scale coordinate location. Such a determination may correspond to determining a relative position of the 2D scale 171'/172' relative to the corresponding reference position (e.g., reference position REF1, REF2, etc.).

As noted above, once the relative positions of each of the 2D scales is determined, such information may be utilized for other position determination and/or control processes (e.g., for determining and/or controlling the end tool position ETP, etc). As indicated above, in some implementations the relative positions of the each of the 2D scales may initially be expressed/determined in terms of local coordinate systems (e.g., scale and/or camera coordinate systems, etc.), and which may then be converted or otherwise processed in reference to a robot coordinate system. The end tool position ETP may be determined and/or controlled in accordance with the robot coordinate system and/or other coordinate system.

FIG. 7 is an isometric diagram of an exemplary implementation of an absolute 2D scale 171"/172". In the example of FIG. 7, similar to the incremental 2D scale 171'/172', the absolute 2D scale 171"/172" includes an array of evenly spaced incremental imageable features IIF, and also includes a set of absolute imageable features AIF having unique identifiable patterns (e.g., a 16-bit pattern). In operation, a location of a field of view FOV within the absolute 2D scale 171"/172" (i.e., as included in a captured image) provides an indication of an absolute position between the 2D scale 171"/172" and the corresponding reference position (e.g., reference position REF1 which corresponds to and/or is indicative of a position of the corresponding camera 161A). In the implementation of FIG. 7, the set of absolute imageable features AIF are distributed on the substrate SUB such that they are spaced apart (e.g., at spacings XSP2 and YSP2) by less than a distance corresponding to a distance across a field of view FOV of a respective camera (i.e., so that at least one absolute imageable feature AIF will always be included in a field of view). In operation, the metrology position coordinate processing portion 190 is configured to identify at least one respective absolute imageable feature AIF included in the acquired image of the 2D scale 171"/172" based on the unique identifiable pattern of the respective absolute imageable feature AIF, as part of a process for determining an absolute relative position of the 2D scale 171"/172" (e.g., as may correspond to or otherwise indicate a relative location, orientation, etc. of the 2D scale 171"/172", in relation to the respective camera and reference position, etc.).

A specific illustrative example of utilizing the absolute imageable features AIF to determine a relatively precise and absolute position is as follows. As illustrated in FIG. 7, the acquired image may indicate that the center of the field of view FOV is in the middle of a number of incremental imageable features IIF. The position information from the included two absolute imageable features AIF indicates which section of the 2D scale 171"/172" the image includes, for which the included incremental imageable features IIF of the 2D scale may also be identified. The acquired image may, accordingly, be analyzed by the metrology position coordinate processing portion 190 to determine precisely where the center of the field of view (i.e., at the coordinates X1, Y1, Z0) occurs within that section of the 2D scale (i.e., which includes the two absolute imageable features AIF and the incremental imageable features IIF).

Figure 8:
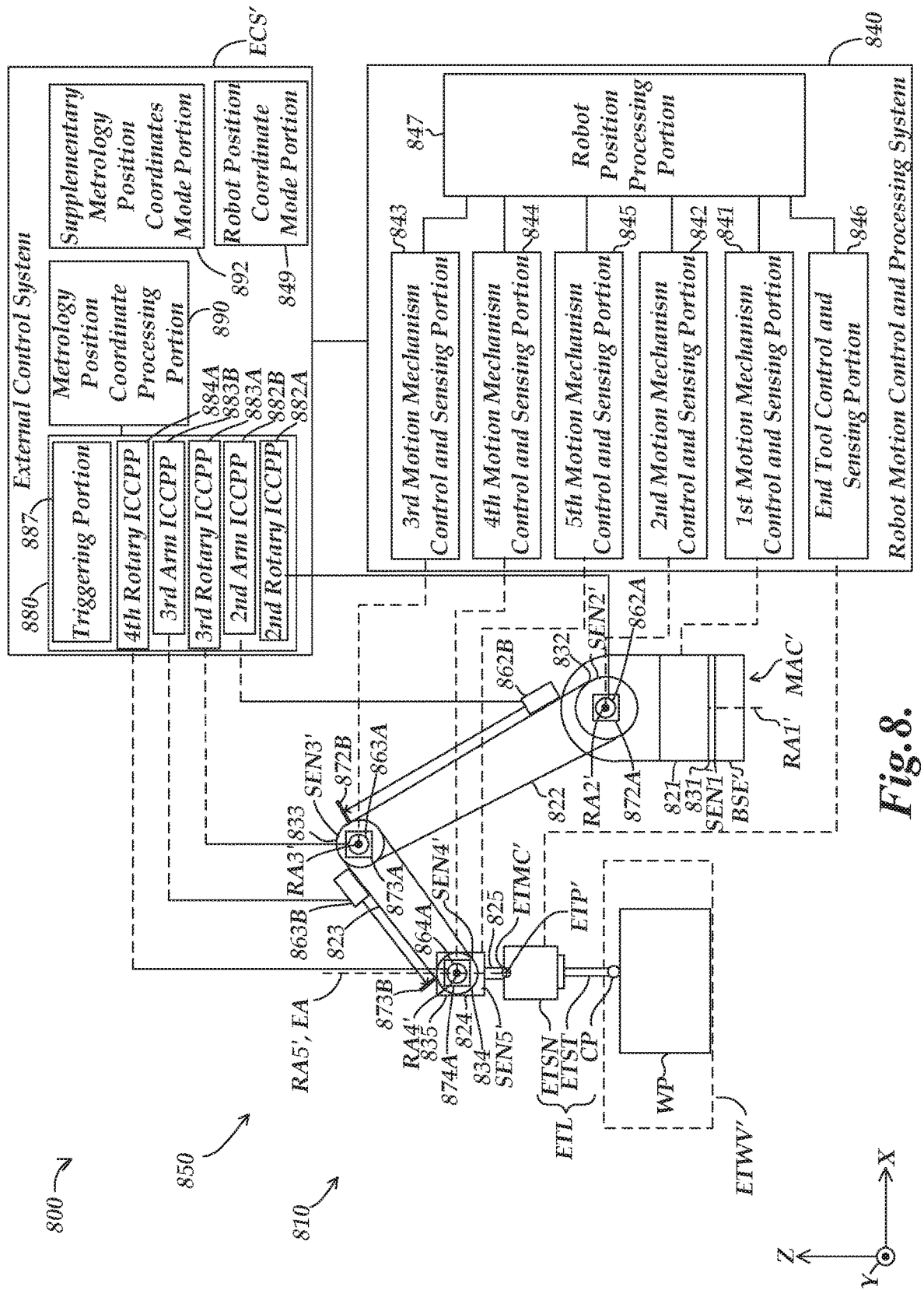
FIG. 8 is a block diagram of a third exemplary implementation of a robot system including an articulated robot and a supplementary metrology position determination system.

FIG. 8 is a block diagram of a third exemplary implementation of a robot system 800 including a robot 810 and a supplementary metrology position determination system 850. The robot 810 (e.g., an articulated robot) includes a movable arm configuration MAC' and a robot motion control and processing system 840. The supplementary metrology position determination system 850 may include at least cameras 862A, 862B, 863A, 863B and 864A, scales 872A, 872B, 873A, 873B and 874A and a metrology position coordinate processing portion 890.

In the example of FIG. 8, the movable arm configuration MAC' includes a lower base portion BSE', arm portions 821-825, motion mechanisms 831-835, position sensors SEN1'-SEN5', and an end tool mounting configuration ETMC'. As will be described in more detail below and as further illustrated in FIG. 9, each of the arm portions 821-825 may have respective proximal ends PE1-PE5 and respective distal ends DE1-DE5. In various implementations, some or all of the arm portions 821-825 may be mounted to respective motion mechanisms 831-835 at respective proximal ends PE1-PE5 of the respective arm portions 821-825. In the example of FIG. 8, some or all of the motion mechanisms 831-835 (e.g., rotary joints and/or linear actuators with corresponding motors, etc.) may enable motion (e.g., rotation, linear motion, etc.) of the respective arm portions 821-825 (e.g., about or along respective rotary axes RA1'-RA5', etc.) In various implementations, the position sensors SEN1'-SEN5' (e.g., rotary encoders, linear encoders, etc.) may be utilized for determining the positions (e.g., angular orientations, linear positions, etc.) of the respective arm portions 821-825.

In various implementations, the movable arm configuration MAC' may have a portion that is designated as a terminal portion (e.g., the fifth arm portion 825). In the example configuration of FIG. 8, the end tool mounting configuration ETMC' is located proximate to (e.g., located at) the distal end DE5 of the fifth arm portion 825 (e.g., designated as the terminal portion), which corresponds to a distal end of the movable arm configuration MAC'. In various alternative implementations, a terminal portion of a movable arm configuration may be an element (e.g., a rotatable element, etc.) that is not an arm portion but for which at least part of the terminal portion corresponds to a distal end of the movable arm configuration where the end tool mounting configuration ETMC' is located.

In various implementations, the end tool mounting configuration ETMC' may include various elements for coupling and maintaining the end tool ETL proximate to the distal end of the movable arm configuration MAC'. For example, in various implementations, the end tool mounting configuration ETMC' may include an autojoint connection, a magnetic coupling portion and/or other coupling elements as are known in the art for mounting an end tool ETL to a corresponding element. The end tool mounting configuration ETMC' may also include electrical connections (e.g., a power connection, one or more signal lines, etc.) for providing power to and/or sending signals to and from at least part of the end tool ETL (e.g., to and from the end tool sensing portion ETSN).

In various implementations, the end tool ETL may include the end tool sensing portion ETSN and the end tool stylus ETST with the contact point CP (e.g., for contacting a surface of a workpiece WP). The fifth motion mechanism 835 is located proximate to the distal end DE4 of the fourth arm portion 824. In various implementations, the fifth motion mechanism 835 (e.g., a rotary joint with a corresponding motor) may be configured to rotate the fifth arm portion 825 about a rotary axis RA5'. In some implementations, the fifth motion mechanism 835 may also or alternatively include a different type of motion mechanism (e.g., a linear actuator) that is configured to move the fifth arm portion 825 linearly (e.g., up and down). In any case, the end tool ETL is mounted to (e.g., coupled to) the end tool mounting configuration ETMC', and has a corresponding end tool position ETP' with corresponding metrology position coordinates (e.g. x, y and z coordinates of the robot coordinate system). In various implementations, the end tool position ETP' may correspond to or be proximate to the position of the end tool mounting configuration ETMC' (e.g., at or proximate to the distal end DE5 of the fifth arm portion 825 which may correspond to the distal end of the movable arm configuration MAC').

The motion control system 840 is configured to control the end tool position ETP' of the end tool ETL with a level of accuracy defined as a robot accuracy. More specifically, the motion control system 840 is generally configured to control the metrology position coordinates (e.g., x, y and z coordinates) of the end tool position ETP' with the robot accuracy based at least in part on utilizing the motion mechanisms 831-835 and position sensors SEN1'-SEN5' for sensing and controlling the positions of the arm portions 821-825. In various implementations, the motion control and processing system 840 may include motion mechanism control and sensing portions 841-845 that may respectively receive signals from the respective position sensors SEN1'-SEN5', for sensing the positions (e.g., angular positions, linear positions, etc.) of the respective arm portions 821-825, and/or may provide control signals to the respective motion mechanisms 831-835 (e.g., including rotary joints, linear actuators, motors, etc.) for moving the respective arm portions 821-825.

The motion control and processing system 840 and/or supplementary metrology position determination system 850 may also receive signals from the end tool sensing portion ETSN. In various implementations, the end tool sensing portion ETSN may include circuitry and/or configurations related to the operations of the end tool ETL for sensing a workpiece WP. As will be described in more detail below, in various implementations the end tool ETL (e.g., a touch probe, a scanning probe, a camera, etc.) may utilized for contacting or otherwise sensing surface locations/positions/points on a workpiece WP, for which various corresponding signals may be received, determined and/or processed by the end tool sensing portion ETSN which may provide corresponding signals to the motion control and processing system 840 and/or supplementary metrology position determination system 850. In various implementations, the motion control and processing system 840 and/or supplementary metrology position determination system 850 may include an end tool control and sensing portion 846 that may provide control signals to and/or receive sensing signals from the end tool sensing portion ETSN. In various implementations, the end tool control and sensing portion 846 and the end tool sensing portion ETSN may be merged and/or indistinguishable. In various implementations, the motion mechanism control and sensing portions 841-845 and the end tool control and sensing portion 846 may all provide outputs to and/or receive control signals from a robot position processing portion 847 which may control and/or determine the overall positioning of the movable arm configuration MAC' of the robot 810 and corresponding end tool position ETP' as part of the robot motion control and processing system 840.

In various implementations, the supplementary metrology position determination system 850 may be included with or otherwise added to a robot 810 (e.g., as part of a retrofit configuration for being added to an existing robot 810, etc., for which in various implementations the robot may be an articulated robot, a SCARA robot, a cartesian robot, a cylindrical robot, a spherical robot, etc.) In general, the supplementary metrology position determination system 850 may be utilized to provide an improved level of accuracy for the determination of the end tool position ETP'. More specifically, as will be described in more detail below, the supplementary metrology position determination system 850 may be utilized to determine metrology position coordinates that are indicative of the end tool position ETP', with an accuracy level that is better than the robot accuracy.

As illustrated in FIG. 8, the supplementary metrology position determination system 850 includes five camera/scale sets, including cameras 862A, 862B, 863A, 863B and 864A, each directed at a corresponding scale 872A, 872B, 873A, 873B and 874A. The scales 872A, 873A and 874A are on rotary joints of the robot (e.g., each at a coupling location corresponding to a rotary axis of the respective rotary joint), and the scales 872B and 873B are on arm portions of the robot. More specifically, the scale 872A is coupled to the rotary joint of the second motion mechanism 832 at a first 2D scale coupling location, the scale 872B is coupled to the second arm portion 822 at a second 2D scale coupling location, the scale 873A is coupled to the rotary joint of the third motion mechanism 833 at a third 2D scale coupling location, the scale 873B is coupled to the third arm portion 823 at a fourth 2D scale coupling location, and the scale 874A is coupled to the rotary joint of the fourth motion mechanism 834 at a fifth 2D scale coupling location. Each of the five cameras 862A, 862B, 863A, 863B and 864A is controlled by and provides image signals to a respective imaging configuration control and processing portion (ICCPP) 882A, 882B, 883A, 883B and 884A. An image triggering portion 887 may in some instances coordinate the triggering of all of the cameras to obtain an image at the same time (e.g., as corresponding to a position of the robot at a particular moment in time for determining the end tool position at the end of the robot at that time).

In various implementations, the end tool working volume ETWV' consists of a volume in which at least a portion of the end tool ETL may be moved. In the example of FIG. 8, the end tool working volume ETWV' is illustrated as including a volume in which the contact point CP of the end tool ETL may be moved when inspecting a workpiece. In various implementations, the robot 810 is configured to move the movable arm configuration MAC' so as to move at least a portion of the end tool ETL (e.g., the contact point CP) that is mounted to the end tool mounting configuration ETMC' along at least two dimensions (e.g., x and y dimensions) in the end tool working volume ETWV'. In the example of FIG. 8, the portion of the end tool ETL (e.g., the contact point CP) is movable by the robot 810 along three dimensions (e.g., x, y and z dimensions).

In various implementations, as described above with respect to FIGS. 5-7, each of the 2D scales 872A, 872B, 873A, 873B and 874A may comprise a nominally planar substrate SUB and a plurality of respective imageable features that are distributed on the substrate SUB. As used herein, the term "nominally" encompasses variations of one or more parameters that fall within acceptable tolerances. The respective imageable features are located at respective known local x and y scale coordinates on each 2D scale. In various implementations, each 2D scale may be an incremental or absolute scale.

In various implementations, the imaging and sensing configuration control and processing portion 880, the triggering portion 887 and/or the metrology position coordinate processing portion 890 may be included as part of an external control system ECS' (e.g., as part of an external computer, etc.) The triggering portion 887 may be included as part of the imaging and sensing configuration control and processing portion 880. In various implementations, the triggering portion 887 is configured to input at least one input signal that is related to the end tool position ETP' and to determine the timing of a first trigger signal based on the at least one input signal, and to output the first trigger signal to the cameras 862A, 862B, 863A, 863B and 864A. In various implementations, each of the cameras 862A, 862B, 863A, 863B, and 864A is configured to acquire a digital image of the corresponding 2D scale 872A, 872B, 873A, 873B, and 874A at an image acquisition time in response to receiving the first trigger signal. In various implementations, the metrology position coordinate processing portion 890 is configured to input the acquired images and to identify at least one respective imageable feature included in the acquired images of the 2D scales and the related respective known 2D scale coordinate location. In various implementations, the external control system ECS' may also include a standard robot position coordinates mode portion 849 and a supplementary metrology position coordinates mode portion 892, for implementing corresponding modes, as will be described in more detail below.

In various implementations, each imaging configuration control and processing portion 882A, 882B, 883A, 883B and 884A may include a component (e.g., a subcircuit, routine, etc.) that activates an image integration of the corresponding camera 862A, 862B, 863A, 863B and 864A periodically (e.g., at a set timing interval) for which the first trigger signal from the triggering portion 887 may activate a strobe light timing (e.g., for which each camera 862A, 862B, 863A, 863B and 864A may include a strobe light) or other mechanism to effectively freeze motion and correspondingly determine an exposure within the integration period. In such implementations, if no first trigger signal is received during the integration period, a resulting image may be discarded, wherein if a first trigger signal is received during the integration period, the resulting image may be saved and/or may otherwise be processed/analyzed to determine metrology position coordinates, as will be described in more detail below.

In various implementations, different types of end tools ETL may provide different types of outputs that may be utilized with respect to the triggering portion 887. For example, in an implementation where the end tool ETL is a touch probe that is used for measuring a workpiece and that outputs a touch signal when it touches the workpiece (e.g., when the contact point CP contacts the workpiece), the triggering portion 887 may be configured to input that touch signal or a signal derived therefrom as the at least one input signal that the timing of a first trigger signal is determined based on. As another example, in an implementation where the end tool ETL is a scanning probe that is used for measuring a workpiece and that provides respective workpiece measurement sample data corresponding to a respective sample timing signal, the triggering portion 887 may be configured to input that respective sample timing signal or a signal derived therefrom as the at least one input signal. As another example, in an implementation where the end tool ETL is a camera that is used to provide a respective workpiece measurement image corresponding to a respective workpiece image acquisition signal, the triggering portion 887 may be configured to input that workpiece image acquisition signal or a signal derived therefrom as the at least one input signal.

In the example implementation of FIG. 8, the supplementary metrology position determination system 850 is configured such that the metrology position coordinate processing portion 890 is operable to determine a relative position between each 2D scale 872A, 872B, 873A, 873B, and 874A and the corresponding reference position REF1', REF2', REF3', REF4', REF5' (e.g., as corresponding to and/or indicative of the position of the respective camera 862A, 862B, 863A, 863B and 864A), such as based on determining an image position of the identified at least one respective imageable feature in each acquired image. The determined relative positions may be utilized (e.g., by the supplementary metrology position determination system 850) to determine the metrology position coordinates of the end tool position ETP' at the image acquisition time, with an accuracy level that is better than the robot accuracy.

It will be appreciated that the robot systems such as those illustrated in FIGS. 1 and 8 may have certain advantages over various alternative systems. For example, in various implementations systems such as those disclosed herein may be smaller and/or less expensive than alternative systems utilizing technologies such as laser trackers or photogrammetry for tracking robot movement/positions, and may also have higher accuracy in some implementations. The disclosed systems also do not take up or obscure any part of the end tool working volume ETWV or ETWV', such as alternative systems that may include a scale or fiducial on the ground or stage, or otherwise in the same area (e.g., in the end tool working volume ETWV or ETWV) where workpieces may otherwise be worked on and/or inspected, etc. In addition, in various implementations by having all of the cameras and scales coupled to the robot (e.g., including as coupled to moving portions of the movable arm configuration such as arm portions and rotary joints), no external structure or external coupling in the robot environment needs to be provided for the cameras or scales.

Figure 9:
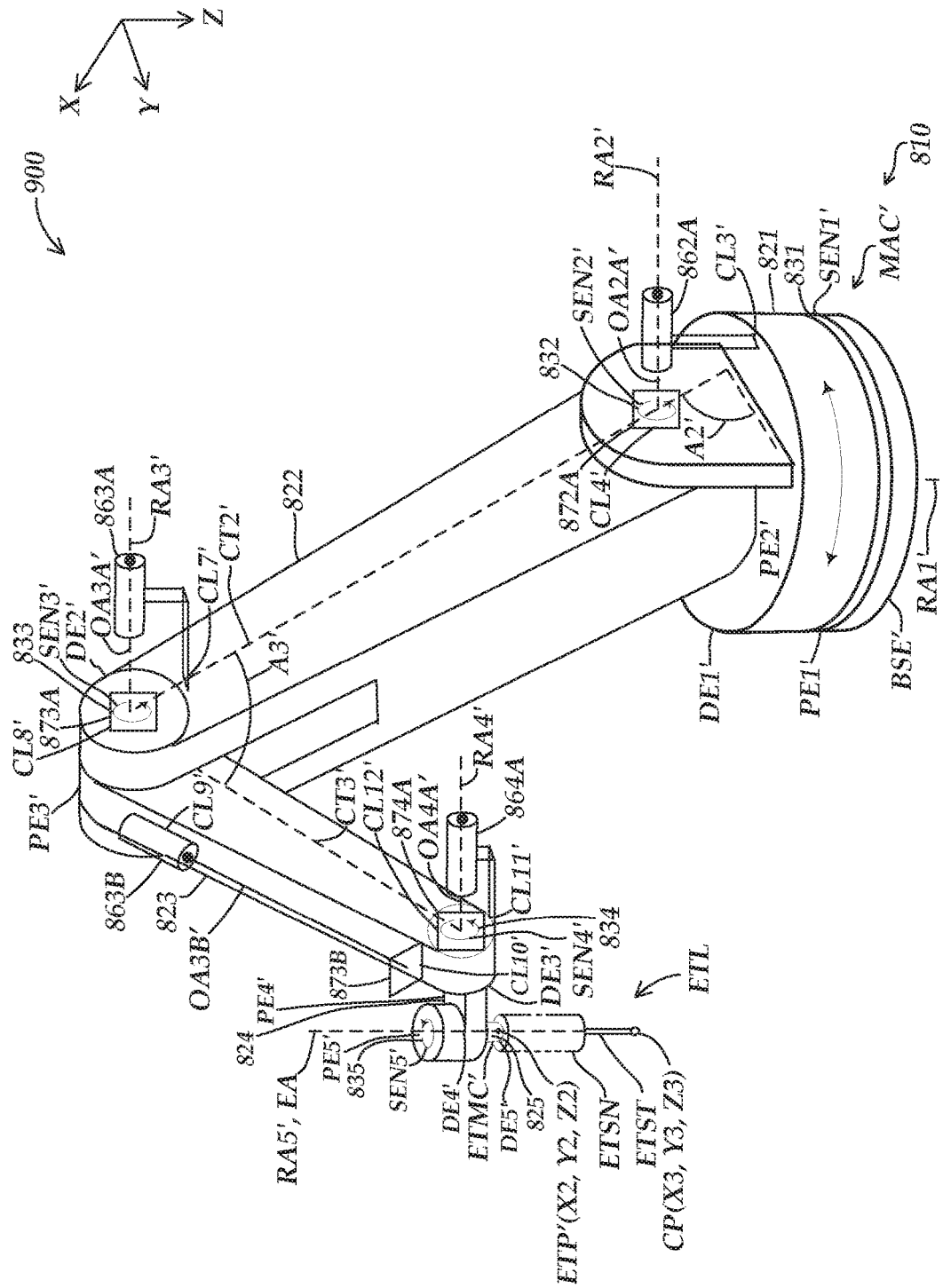
FIG. 9 is an isometric diagram of a fourth exemplary implementation of a robot system similar to the robot system of FIG. 8 including an articulated robot.

FIG. 9 is an isometric diagram of a fourth exemplary implementation of a robot system 900 that is substantially similar to the robot system 800 of FIG. 8. It will be appreciated that, similar to the numbering schemes described above, certain named or numbered components (e.g., 8XX, 8XX' or 9XX) of FIG. 9 may correspond to and/or have similar operations as identically or similarly named or numbered counterpart components (e.g., 8XX) of FIG. 8, or of other figures, and may be understood to be similar or identical thereto and may otherwise be understood by analogy thereto and as otherwise described below. As noted above, this naming and numbering scheme to indicate elements having analogous and/or identical design and/or function is generally applied to various figures of this application (e.g., FIGS. 1-11).

As illustrated in FIG. 9, the first arm portion 821 (e.g., an upper base portion) is mounted to the first motion mechanism 831 (e.g., including a rotary joint) at a proximal end PE1 of the first arm portion 821. The first motion mechanism 831 is located at an upper end of the lower supporting base portion BSE' and has a rotary axis RA1' such that the first arm portion 821 is intended to rotate in a nominally horizontal plane. In various implementations, the position sensor SEN1' (e.g., a rotary encoder) may be utilized for determining the angular position (e.g., the angular orientation) of the first arm portion 820.

The second motion mechanism 832 (e.g., including a rotary joint) is located proximate to a distal end DE1 of the first arm portion 821. The second motion mechanism 832 has a rotary axis RA2'. The second arm portion 822 is mounted to the second motion mechanism 832 at a proximal end PE2 of the second arm portion 822, such that the second arm portion 822 moves about the second motion mechanism 832. In various implementations, the position sensor SEN2' (e.g., a rotary encoder) may be utilized for determining the angular position of the second arm portion 822.

The third motion mechanism 833 (e.g., including a rotary joint) is located at a distal end DE2 of the second arm portion 822. The third motion mechanism 833 has a rotary axis RA3'. The third arm portion 823 is mounted to the third motion mechanism 833 at a proximal end PE3 of the third arm portion 823, such that the third arm portion 823 moves about the third motion mechanism 833. In various implementations, the position sensor SEN3' (e.g., a rotary encoder) may be utilized for determining the angular position of the third arm portion 823.

The fourth motion mechanism 834 (e.g., including a rotary joint) is located at a distal end DE3 of the third arm portion 823. The fourth motion mechanism 834 has a rotary axis RA4'. The fourth arm portion 824 is mounted to the fourth motion mechanism 834 at a proximal end PE4 of the fourth arm portion 824, such that the fourth arm portion 824 rotates. In various implementations, the position sensor SEN4' (e.g., a rotary encoder) may be utilized for determining the angular position of the fourth arm portion 824.

The fifth motion mechanism 835 may be located at a distal end DE4 of the fourth arm portion 824. As noted above, in some implementations, the fifth motion mechanism 835 (e.g., including a rotary joint) may be configured to rotate the fifth arm portion 825 about a rotary axis RA5'. In such configurations, the fifth arm portion 825 may be mounted to the fifth motion mechanism 835 at a proximal end PE5 of the fifth arm portion 825. In some implementations, the fifth motion mechanism 835 may also or alternatively include a different type of motion mechanism (e.g., a linear actuator)

that is configured to move the fifth arm portion 825 linearly (e.g., up and down). In various implementations, the fifth arm portion 825 may be designated as a terminal portion of the movable arm configuration MAC', wherein the distal end of the movable arm configuration MAC' corresponds to the distal end DE5 of the fifth arm portion 825, where the end tool mounting configuration ETMC' may be located. In an implementation where the fifth motion mechanism 835 includes a rotary joint, the end tool ETL may in some configurations be made to correspondingly rotate (e.g., in some instances in an x-y plane that is perpendicular to the z axis).

In various implementations, different reference axes and lines may be designated for referencing certain movements, coordinates and angles of the components of the movable arm configuration MAC'. As some specific examples, as illustrated in FIG. 9 the second and third arm portions 822 and 823 may each have designated center lines CT2' and CT3', respectively, passing down the centers of the respective arm portions. It will be appreciated that the other arm portions 821, 824 and 825 may similarly have corresponding reference lines and/or axes, etc. for referencing certain movements, coordinates and angles of the components of the movable arm configuration MAC'.

In various implementations, the end tool ETL may be mounted (e.g., coupled) to the end tool mounting configuration ETMC' proximate to the distal end DE5 of the fifth arm portion 825. The end tool ETL may be designated as having an end tool axis EA (e.g., passing through the middle and/or central axis of the stylus ETST) which may coincide with the fifth rotary axis RA5' of the fifth motion mechanism 835 and which may intersect with an extended line of the fourth rotary axis RA4' of the fourth motion mechanism 834. In various implementations, the end tool axis EA passes through the end tool position ETP'. The end tool position ETP' may be designated as having coordinates of X2, Y2, Z2 (e.g. in the robot coordinate system). In various implementations, the end tool ETL may have a contact point CP (e.g., at the end of an end tool stylus ETST for contacting a workpiece) which may be designated as having coordinates X3, Y3, Z3.

In one specific example implementation, each acquired image of the respective cameras 862A, 862B, 863A, 863B and 864A may be analyzed by the metrology position coordinate processing portion 890 to determine a relative position (e.g., corresponding to a location, orientation, etc. of the respective scale 872A, 872B, 873A, 873B and 874A). Such determinations may be made in accordance with standard camera/scale image processing techniques (e.g., for determining a location, orientation, etc. of a camera relative to a scale). Various examples of such techniques are described in the previously incorporated U.S. Pat. Nos. 6,781,694; 6,937,349; 5,798,947; 6,222,940 and 6,640,008. In various implementations, such techniques may be utilized to determine the location of a field of view (e.g., as corresponding to a position, orientation, etc. of a camera) within a scale range (e.g., within each 2D scale 872A, 872B, 873A, 873B and 874A), as described above with respect to FIGS. 5-7. In various implementations, such a determination may include identifying at least one respective imageable feature included in the acquired image of the respective 2D scale and the related respective known 2D scale coordinate location. Such a determination may correspond to determining a relative position between the respective 2D scale 872A, 872B, 873A, 873B and 874A and the corresponding reference position REF1', REF2', REF3', REF4' and REF5' (e.g., as corresponding to and/or indicative of the position of the respective camera 862A, 862B, 863A, 863B and 864A).

Figure 10:
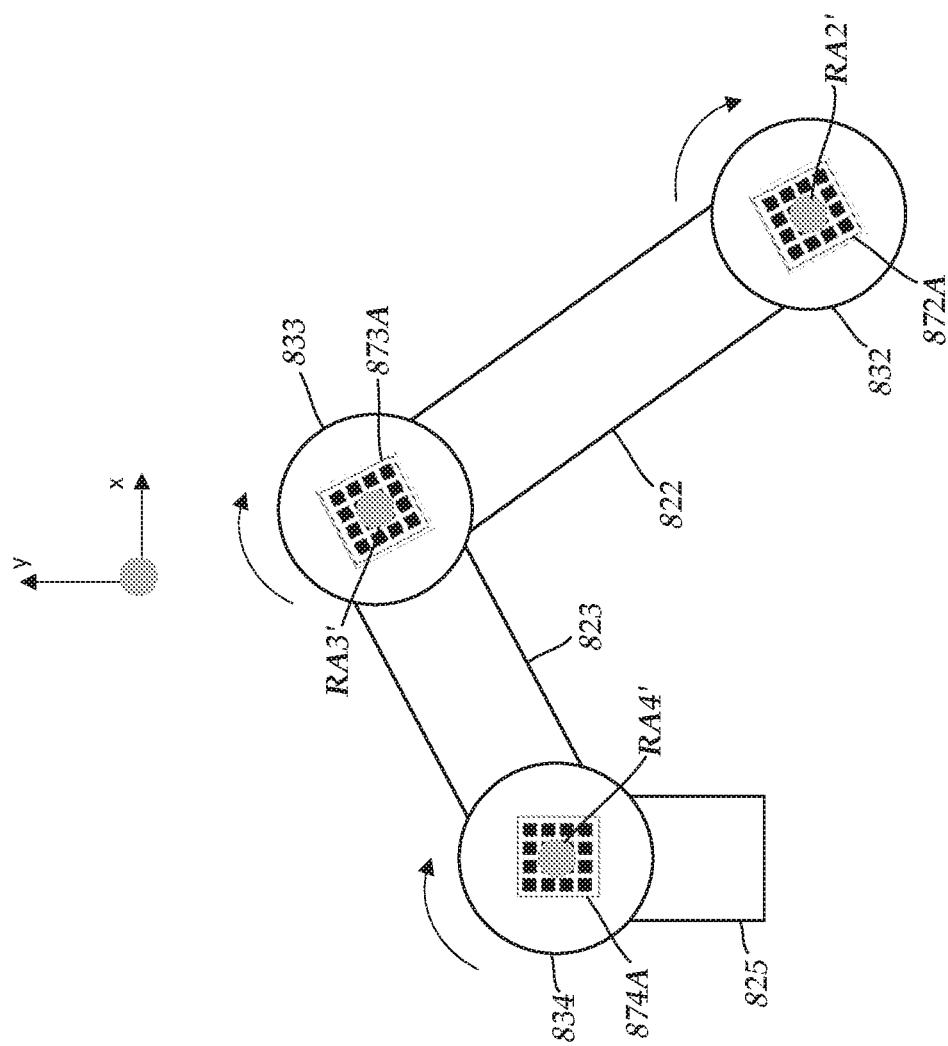
FIG. 10 is a side view of a portion of a robot system.

FIG. 10 is side view of a portion of a robot system similar to that of FIGS. 8 and 9. More specifically, FIG. 10 shows a side view of the second, third, and fifth arm portions 822, 823, and 825, the second, third, and fourth motion mechanisms 832, 833, and 834, and the scales 872A, 873A, and 874. The scale 872A is coupled to the rotary joint of the second motion mechanism 832 at a first 2D scale coupling location, the scale 873A is coupled to the rotary joint of the third motion mechanism 833 at a second 2D scale coupling location, and the scale 874A is coupled to the rotary joint of the fourth motion mechanism 834 at a third 2D scale coupling. A motion transverse to the rotary axis RA2' during rotation of the rotary joint of the second motion mechanism 832 causes a change in the relative position of the scale 872A (e.g., in the x-axis and/or y-axis directions of the camera coordinate system). A motion transverse to the rotary axis RA3' during rotation of the rotary joint of the third motion mechanism 833 causes a change in the relative position of the scale 873A (e.g., in the x-axis and/or y-axis directions of the camera coordinate system). A motion transverse to the rotary axis RA4' during rotation of the rotary joint of the fourth motion mechanism 834 causes a change in the relative position of the scale 874A (e.g., in the x-axis and/or y-axis directions of the local camera coordinate system). The cameras 862A, 863A, and 864A are positioned such that they can obtain images of the features included on the scales 872A, 873A, and 874A, respectively. Based on those images, the metrology position coordinate processing portion 890 determines the respective angular orientations of the scales 872A, 873A, and 874A, and also determines relative positions of the scales 872A, 873A, and 874A (e.g., in terms of the x-axis and y-axis coordinates of the local camera coordinate system) which the metrology position coordinate processing portion 890 uses to detect possible undesirable motion transverse to the respective rotary axis RA2', RA3', and RA4'. The metrology position coordinate processing portion 890 uses the determined relative positions of the scales 872A, 873A, and 874A to detect so-called "wobble", "slop" or other motion of the rotary joints of the second, third, and fourth motion mechanisms 832, 833, and 834 that the regular robot encoders would not normally detect or account for and would thus result in measurement errors in relation to determining the end tool position at the end of the robot arm.

FIG. 11 is a side view of a portion of a robot system similar to that shown in FIGS. 8 and 9. More specifically, FIG. 11 shows a side view of the second arm portion 822, the camera 862B, and the scale 872B. Although not shown in FIG. 11, the scale 872B is positioned near the rotary joint of the third motion mechanism 833 that is coupled to the third arm portion 823 (see FIG. 9). In various implementations, the second arm portion 822, third arm portion 823 and/or other components coupled to the third arm portion 823 may be sufficiently heavy to cause bending or twisting of the second arm portion 822, as shown by dashed lines in FIG. 11. Such bending or twisting may cause a change in a relative position of the scale 872B, wherein the scale 872B moves from an expected position P1' to a bent position P2'. A corresponding amount of movement/position change D12' can be detected/measured in accordance with the movement of the scale 872B relative to the camera 862B. More specifically, when the second arm portion 822 is bent as illustrated, the field of view of the camera 862B will show a different portion of the scale 872B (e.g., closer to the top of the scale 872B in the illustrated orientation), for which that image can be analyzed to determine the position of the scale 872B and the corresponding amount of bending of the second arm portion 822 (e.g., based at least in part on determinations of different positions of one or more imageable features of the scale in the different images etc.).

Figure 12A:
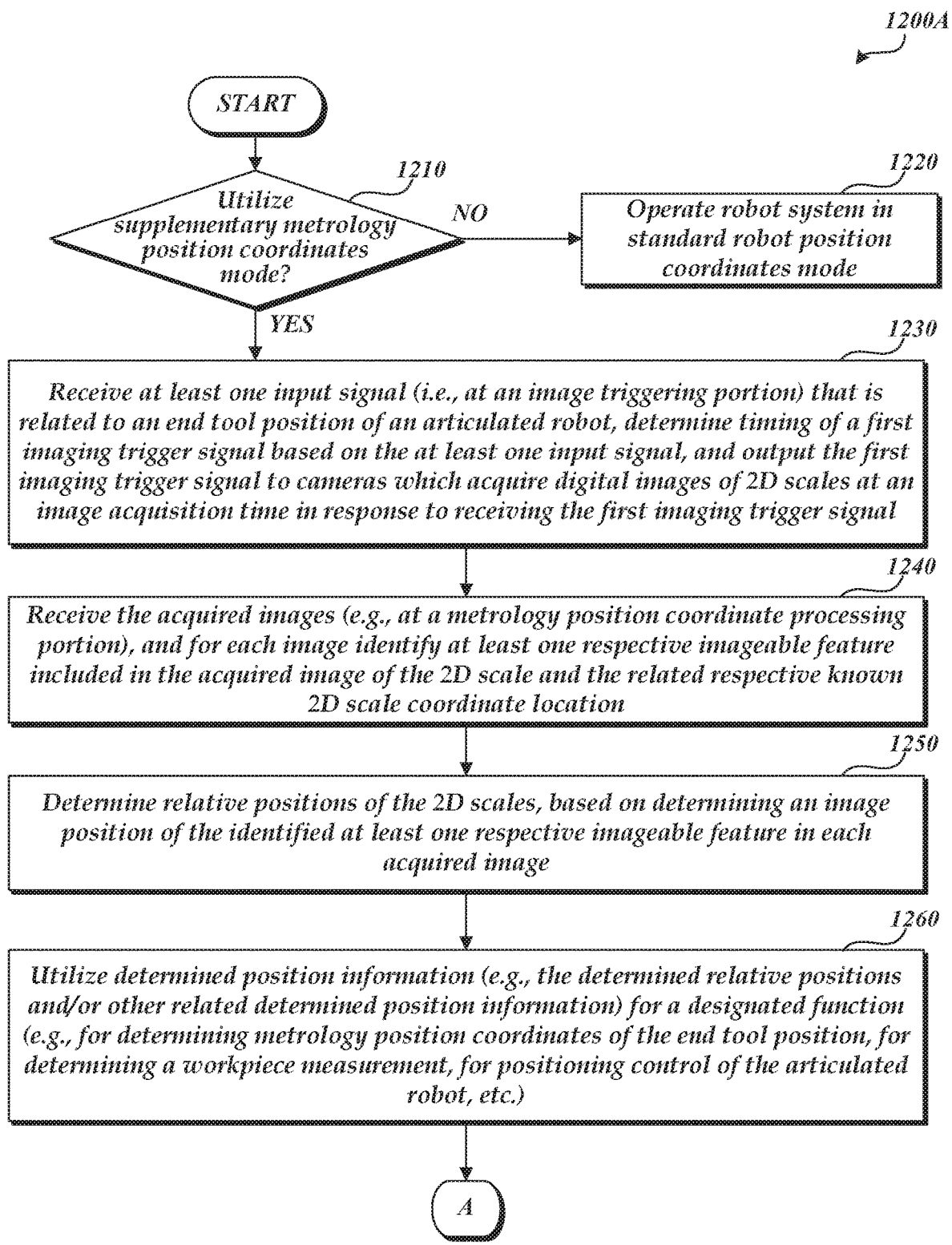
FIGS. 12A and 12B are flow diagrams illustrating exemplary implementations of routines for operating a robot system including an articulated robot and a supplementary metrology position determination system.
Figure 12B:
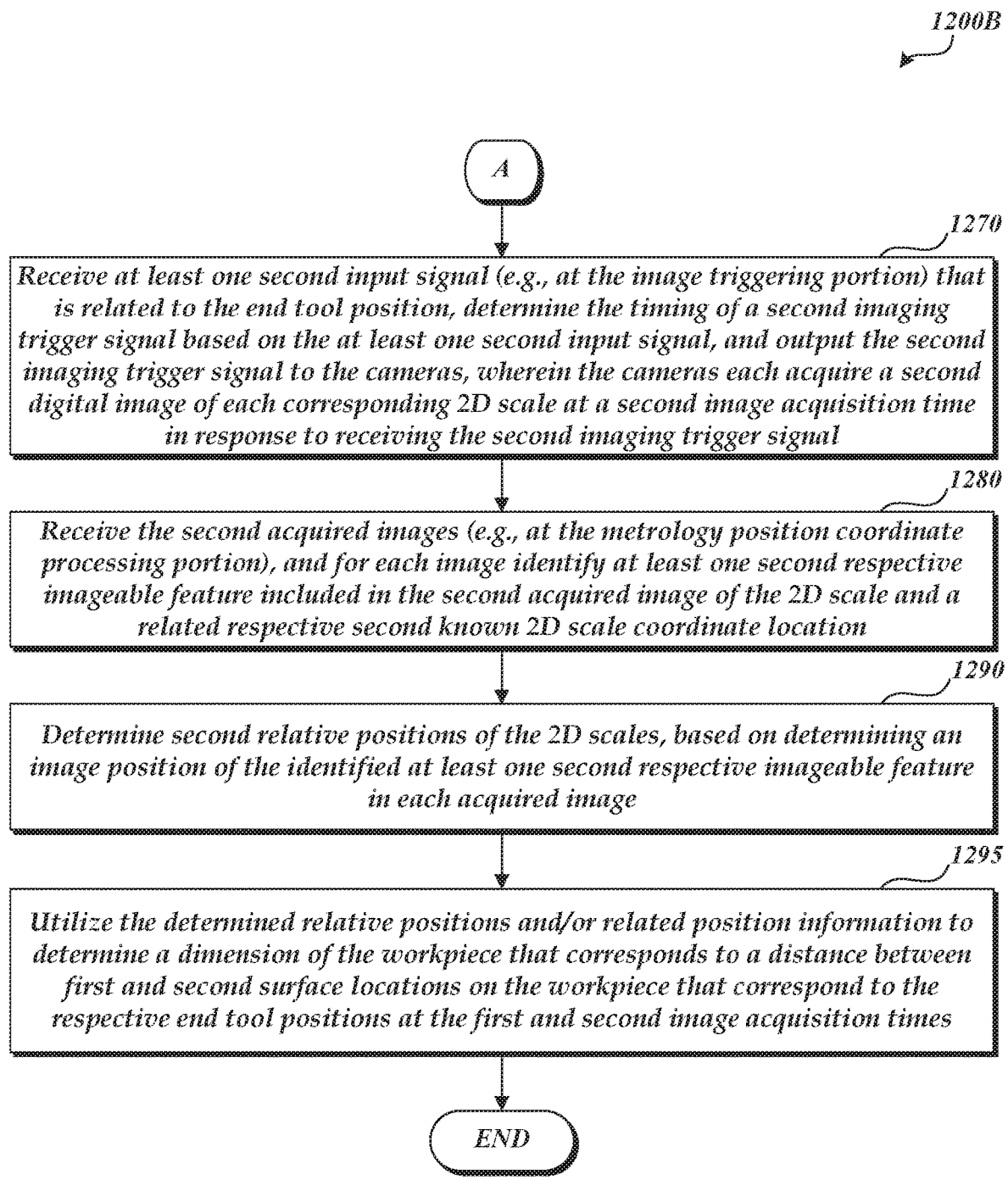

FIGS. 12A and 12B are flow diagrams illustrating exemplary implementations of routines 1200A and 1200B for operating a robot system including an articulated robot and a supplementary metrology position determination system. As shown in FIG. 12A, at a decision block 1210, a determination is made as to whether the robot system is to be operated in a supplementary metrology position coordinates mode. In various implementations, a selection and/or activation of a supplementary metrology position coordinates mode or a standard robot position coordinates mode may be made by a user and/or may be automatically made by the system in response to certain operations and/or instructions. For example, in one implementation a supplementary metrology position coordinates mode may be entered (e.g., automatically or in accordance with a selection by a user) when the articulated robot moves into a particular position (e.g., moves an end tool from a general area where assembly or other operations are performed to a more specific area where workpiece inspection operations are typically performed and where the supplementary metrology position coordinates mode would be utilized). In various implementations, such modes may be implemented by an external control system ECS (e.g., such as the external control system ECS of FIG. 1 utilizing a standard robot position coordinates mode portion 147 and a supplementary metrology position coordinates mode portion 192). In various implementations, a hybrid mode may be operated either independently or as part of a supplementary metrology position coordinates mode and/or may be implemented as a switching between the modes, as will be described in more detail below with respect to FIG. 13.

If at the decision block 1210 it is determined that the robot system is not to be operated in a supplementary metrology position coordinates mode, the routine proceeds to a block 1220, where the robot system is operated in a standard robot position coordinates mode. As part of the standard robot position coordinates mode, the position sensors (e.g., rotary encoders) of the articulated robot are utilized to control and determine the articulated robot movements and corresponding end tool position with the robot accuracy (e.g., which is based at least in part on the accuracy of the position sensors of the articulated robot). In general, the robot position coordinates mode may correspond to an independent and/or standard mode of operation for the articulated robot (e.g., a mode in which the articulated robot is operated independently, such as when a supplementary metrology position determination system is not active or is otherwise not provided).

If the robot system is to be operated in a supplementary metrology position coordinates mode, the routine proceeds to a block 1230, where at least one input signal is received (i.e., at a triggering portion) that is related to an end tool position of an articulated robot. A timing is determined of a first trigger signal based on the at least one input signal and the first trigger signal is output to the cameras of the supplementary metrology position determination system. The cameras each acquire a digital image of a corresponding 2D scale at an image acquisition time in response to receiving the first trigger signal. At a block 1240, the acquired images are received (e.g., at a metrology position coordinate processing portion), and for each image at least one respective imageable feature included in the acquired image of the 2D scale and the related respective known 2D scale coordinate location are identified.

At a block 1250, a relative position of each 2D scale is determined, based on determining an image position of the identified at least one respective imageable feature in each respective acquired image. At a block 1260, determined position information (e.g., including the determined relative positions and/or other related determined position information) is utilized for a designated function (e.g., for determining the metrology position coordinates of the end tool position, for a workpiece measurement, for positioning control of the articulated robot, etc.) As part of such operations or otherwise, the routine may then proceed to a point A, where in various implementations the routine may end, or may otherwise continue as will be described in more detail below with respect to FIG. 12B.

As indicated in FIG. 12B, the routine 1200B may continue from the point A to a block 1270. As will be described in more detail below, as part of the routine 1200B, the determined position information (e.g., from the block 1260) may correspond to or otherwise be utilized for determining a first surface location on a workpiece, and for which a second surface location on the workpiece may then be determined (e.g., as part of a workpiece measurement). At the block 1270, at least one second input signal is received (e.g., at the triggering portion) that is related to the end tool position, and the timing of a second trigger signal is determined based on the at least one second input signal. The second trigger signal is output to the cameras of the supplementary metrology position determination system, wherein the cameras each acquire a second digital image of the corresponding 2D scale at a second image acquisition time in response to receiving the second trigger signal.

At a block 1280, the acquired images are received (e.g., at the metrology position coordinate processing portion), and for each image at least one second respective imageable feature included in the second acquired image of the 2D scale and a related respective second known 2D scale coordinate location are identified. At a block 1290, a second relative position of each 2D scale is determined, based on determining a second image position of the identified at least one second respective imageable feature in each respective second acquired image.

At a block 1295, the determined relative positions and/or related position information is utilized to determine a dimension of the workpiece that corresponds to a distance between the first and second surface locations on the workpiece that correspond to the respective end tool positions (e.g., as indicating the contact point positions, etc.) at the first and second image acquisition times. It will be appreciated that rather than using the position sensors (e.g., rotary encoders) of the articulated robot to determine the first and second surface locations on the workpiece with the robot accuracy, more accurate position information may be determined utilizing the techniques as described above.

Figure 13:
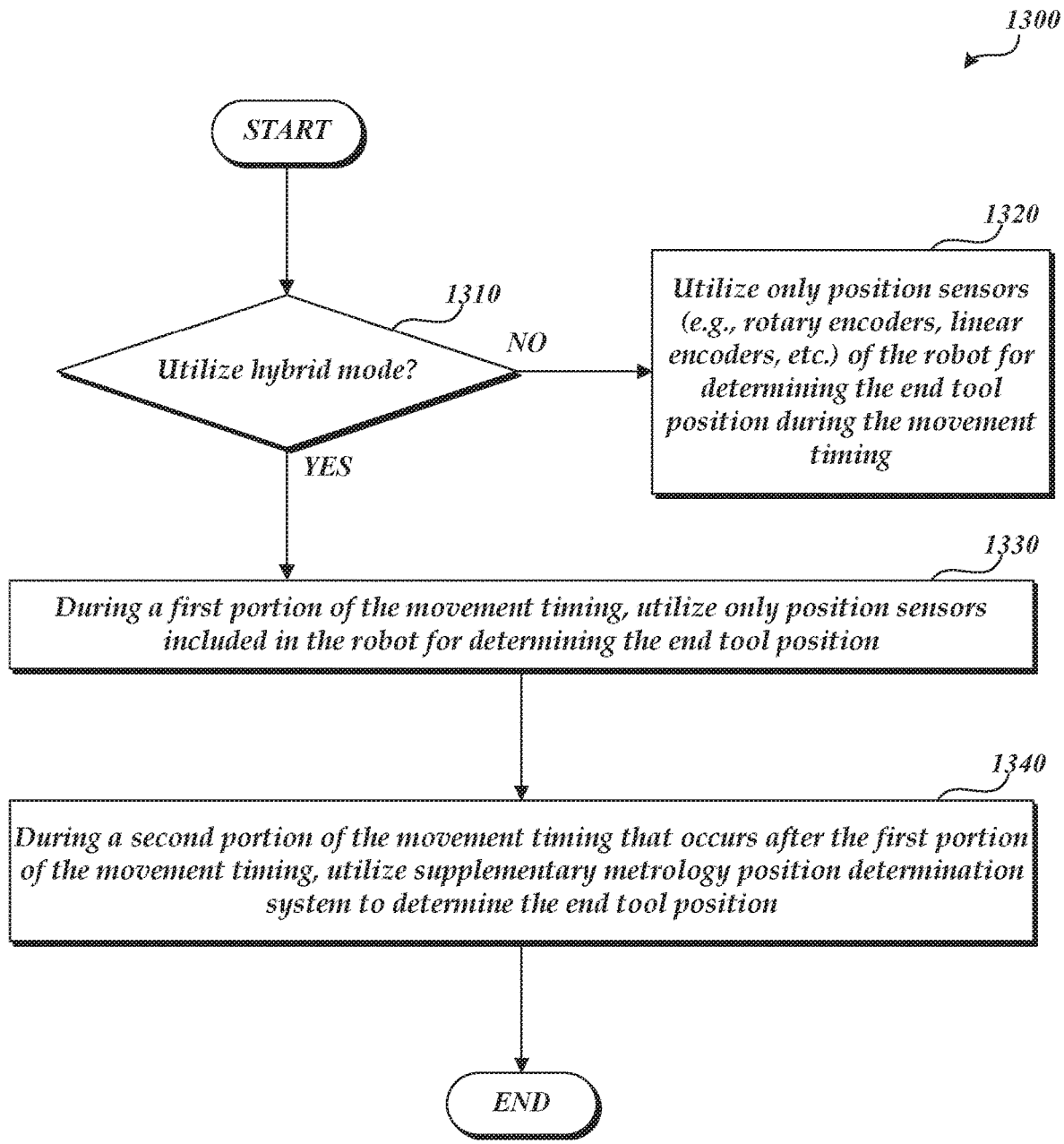
FIG. 13 is a flow diagram illustrating an exemplary implementation of a routine for determining an end tool position in which position sensors of a robot may be utilized during a first portion of a movement timing and a supplementary metrology position determination system may be utilized during a second portion of a movement timing.

FIG. 13 is a flow diagram illustrating one exemplary implementation of a routine 1300 for determining an end tool position in which different techniques may be utilized during different portions of a movement timing. In general, during the movement timing one or more arm portions of the robot are moved from first positions to second positions (e.g., which may include rotating one or more arm portions around motion mechanisms from first rotary orientations to second rotary orientations, or otherwise moving the arm portions, etc.). As shown in FIG. 13, at a decision block 1310, a determination is made as to whether a hybrid mode will be utilized for determining the end tool position during the movement timing. In various implementations, a hybrid mode may also be representative of a process which includes switching between the supplementary metrology position coordinates mode and the standard robot position coordinates mode, as described above with respect to FIG. 12A. If the hybrid mode is not to be utilized, the routine continues to a block 1320, where the position sensors (e.g., rotary encoders, linear encoders, etc.) of the robot (e.g., of the movable arm configuration, such as movable arm configuration MAC, or MAC', etc.) are solely utilized for determining the end tool position during the movement timing.

If the hybrid mode is to be utilized, the routine proceeds to a block 1330, for which during a first portion of a movement timing, the position sensors included in the robot (e.g., included in the movable arm configuration MAC or MAC' of the robot) are utilized for determining the end tool position. During such operations, a supplementary metrology position determination system may not be utilized to determine the end tool position. At a block 1340, during a second portion of the movement timing that occurs after the first portion of the movement timing, the supplementary metrology position determination system is utilized to determine the end tool position. It will be appreciated that such operations enable the system to perform initial/fast/coarse movement of the end tool position during the first portion of the movement timing, and to perform more accurate final/slower/fine movement of the end tool position during the second portion of the movement timing.

Figure 14:
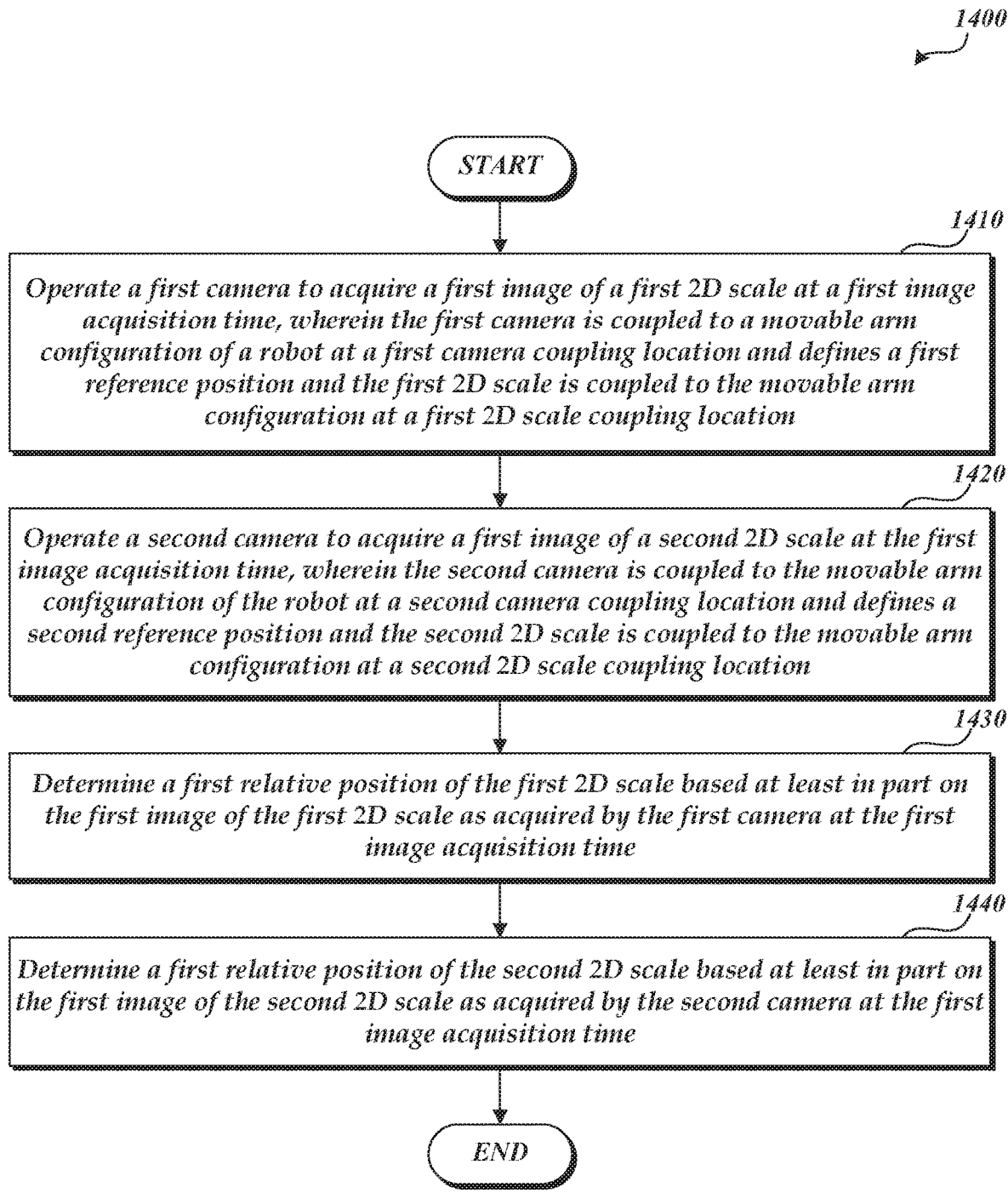
FIG. 14 is a flow diagram illustrating an exemplary implementation of a routine for operating a supplementary metrology position determination system that is utilized with a robot.

FIG. 14 is a flow diagram illustrating an exemplary implementation of a routine 1400 for operating a supplementary metrology position determination system that is utilized with a robot. As shown in FIG. 14, at a block 1410, a first camera is operated to acquire a first image of a first 2D scale at a first image acquisition time, wherein the first camera is coupled to a movable arm configuration of a robot at a first camera coupling location and defines a first reference position and the first 2D scale is coupled to the movable arm configuration at a first 2D scale coupling location. For example, the triggering portion 187 sends a control signal to the camera 161A that causes the camera 161A to acquire a first image of the scale 171A at the first image acquisition time.

At a block 1420, a second camera is operated to acquire a first image of a second 2D scale at the first image acquisition time, wherein the second camera is coupled to the movable arm configuration of the robot at a second camera coupling location and defines a second reference position and the second 2D scale is coupled to the movable arm configuration at a second 2D scale coupling location. For example, the triggering portion 187 sends a control signal to the camera 161B that causes the camera 161B to acquire a first image of the scale 171B the first image acquisition time.

At a block 1430, a first relative position of the first 2D scale is determined based at least in part on the first image of the first 2D scale as acquired by the first camera at the first image acquisition time. For example, the metrology position coordinate processing portion 190 determines a relative position of the scale 171A based on the first image of the scale 171A acquired by the camera 161A at the block 1410.

At a block 1440, a first relative position of the second 2D scale is determined based at least in part on the first image of the second 2D scale as acquired by the second camera at the first image acquisition time. For example, the metrology position coordinate processing portion 190 determines a relative position of the scale 171B based on the first image of the scale 171B acquired by the camera 161B at the block 1420.

In some implementations, after the block 1440, metrology position coordinates of a first end tool position at the first image acquisition time are determined based at least in part on the determined first relative positions of the first and second 2D scales. For example, the metrology position coordinate processing portion 190 determines metrology position coordinates (X2, Y2, Z2) of the end tool position ETP (e.g., see FIG. 2) based at least in part on the determined first relative positions of the scales 171A and 171B.

In some implementations, after the block 1440, the method further includes operating the first camera to acquire a second image of the first 2D scale at a second image acquisition time, operating the second camera to acquire a second image of the second 2D scale at the second image acquisition time, determining a second relative position of the first 2D scale based at least in part on the second image of the first 2D scale as acquired by the first camera at the second image acquisition time, and determining a second relative position of the second 2D scale based at least in part on the second image of the second 2D scale as acquired by the second camera at the second image acquisition time. For example, the acts described above in connection with the blocks 1410, 1420, 1430, and 1440 are repeated at a different time (i.e., the second image acquisition time).

In some implementations, the method further includes determining metrology position coordinates of a first end tool position at the first image acquisition time based at least in part on the determined first relative positions of the first and second 2D scales, and determining metrology position coordinates of a second end tool position at the second image acquisition time based at least in part on the determined second relative positions of the first and second 2D scales. For example, the metrology position coordinate processing portion 190 determines metrology position coordinates (X2a, Y2a, Z2a) of the end tool position ETP based at least in part on the determined first relative positions of the scales 171A and 171B, and determines metrology position coordinates (X2b, Y2b, Z2b) of the end tool position ETP based at least in part on the determined second relative positions of the scales 171A and 171B. In some implementations, the method further includes utilizing the determined metrology position coordinates of the first and second end tool positions to determine a dimension that is related to a distance between the first and second end tool positions. For example, the metrology position coordinate processing portion 190 calculates a distance between the first and second end tool positions using the metrology position coordinates (X2a, Y2a, Z2a) and the metrology position coordinates (X2b, Y2b, Z2b) mentioned above, and determines a dimension that is related to the distance between the first and second end tool positions. The dimension may be or correspond to a distance between first and second surface locations on a workpiece, wherein a contact point of the end tool contacts the first surface location on the workpiece at the first image acquisition time and contacts the second surface location on the workpiece at the second image acquisition time.

In some implementations, before the block 1410, the method further includes coupling the first and second 2D scales to the movable arm configuration at the first and second 2D scale coupling locations, respectively, coupling the first camera to the movable arm configuration at the first camera coupling location, and coupling the second camera to the movable arm configuration at the second camera coupling location. For example, the method includes coupling the scale 171A to the first arm portion 121 at the scale coupling location CL2, coupling the scale 171B to the first arm portion 121 at the scale coupling location CL4, coupling the camera 161A to the supporting base portion BSE at the camera coupling location CL1, and coupling the camera 161B to the first arm portion 121 at the camera coupling location CL3.

It will be appreciated that in other examples, the first and second cameras may be any of the cameras 161A, 161B, 162A, 162B, 862A, 862B, 863A, 863B, 864A, etc., and the first and second 2D scales may be any of the scales 171A, 171B, 172A, 172B, 872A, 872B, 873A, 873B, 874A, etc., and may correspondingly be in any of the configurations as described herein.

It will be understood that although the element name "2D scale" has been used in this disclosure with reference to the relative scale elements, and the like, this element name is exemplary only, and not limiting. It is referred to as a "2D scale" with reference to x and y scale coordinates as part of a cartesian coordinate system, and its description as comprising a nominally planar substrate. However, more generally, the element name 2D scale should be understood to refer to any reference scale comprising a plurality of features or markings that correspond to known two dimensional coordinates on that reference scale (e.g. accurate and/or accurately calibrated locations in two dimensions), provided that the scale is able to operate as disclosed herein. For example, such scale features may be expressed and/or marked to be in a cartesian coordinate system on that reference scale, or in a polar coordinate system, or any other convenient coordinate system. Furthermore, such features may comprise features distributed evenly or unevenly throughout an operational scale area, and may comprise graduated or ungraduated scale markings, provided that such features correspond to known two dimensional coordinates on the scale and are able to operate as disclosed herein.

It will be understood that although the robot systems and corresponding movable arm configurations disclosed and illustrated herein are generally shown and described with reference to a certain number of arm portions (e.g., 3 arm portions, 5 arm portions, etc.), such systems are not so limited. In various implementations, provided that it includes arm portions such as those described herein, the robot system may include fewer or more arm portions if desired.

It will be understood that as described herein a 2D scale and a camera that is used to image the scale may undergo rotation relative to one another (e.g., with the scale mounted on a rotary joint, etc.), depending on the motion and/or position of the robot system. It will be appreciated that methods known in the art (e.g. as disclosed in the incorporated references) may be used to accurately determine any such relative rotation and/or perform any required coordinate transformations, and/or analyze the relative position of the camera and the scale according to principles disclosed herein, in regard to such relative rotations. It will be understood that the metrology position coordinates referred to herein may in various implementations take into account any such relative rotation. Furthermore, it will be understood that in some implementations the metrology position coordinates referred to herein comprise a set of coordinates that include a precise determination and/or indication of any such relative rotation.

While preferred implementations of the present disclosure have been illustrated and described, numerous variations in the illustrated and described arrangements of features and sequences of operations will be apparent to one skilled in the art based on this disclosure. Various alternative forms may be used to implement the principles disclosed herein. In addition, the various implementations described above can be combined to provide further implementations. All of the U.S. patents and U.S. patent applications referred to in this specification are incorporated herein by reference, in their entirety. Aspects of the implementations can be modified, if necessary to employ concepts of the various patents and applications to provide yet further implementations.

These and other changes can be made to the implementations in light of the above-detailed description. In general, in the following claims, the terms used should not be construed to limit the claims to the specific implementations disclosed in the specification and the claims, but should be construed to include all possible implementations along with the full scope of equivalents to which such claims are entitled.

The invention claimed is:

1. A robot system, comprising:
   a robot, comprising:
      a movable arm configuration, comprising:
         a first arm portion mounted to a first rotary joint at a proximal end of the first arm portion, the first rotary joint having a first rotary axis, wherein the first arm portion has a second rotary joint located at a distal end of the first arm portion, the second rotary joint having a second rotary axis;
         a second arm portion mounted to the second rotary joint at a proximal end of the second arm portion, such that the second arm portion rotates about the second rotary joint; and
         an end tool mounting configuration for mounting an end tool, wherein the end tool mounting configuration is located proximate to a distal end of the movable arm configuration; and
      a motion control system configured to control an end tool position of the end tool with a level of accuracy defined as a robot accuracy, based at least in part on sensing and controlling the angular positions of the first and second arm portions about the first and second rotary joints, respectively, using rotary sensors included in the robot; and
   a supplementary metrology position determination system, comprising:
      first and second two-dimensional (2D) scales that are coupled to the movable arm configuration at first and second 2D scale coupling locations, respectively, each 2D scale comprising a nominally planar substrate and a plurality of respective imageable features distributed on the planar substrate;
      a first camera for acquiring an image of the first 2D scale at an image acquisition time, wherein the first camera defines a first reference position and the first camera is coupled to the movable arm configuration at a first camera coupling location;
      a second camera for acquiring an image of the second 2D scale at the image acquisition time, wherein the second camera defines a second reference position and the second camera is coupled to the movable arm configuration at a second camera coupling location; and
      a metrology processing portion configured to:
         determine a first relative position of the first 2D scale based at least in part on a first image of the first 2D scale as acquired by the first camera at a first image acquisition time; and determine a first relative position of the second 2D scale based at least in part on a first image of the second 2D scale as acquired by the second camera at the first image acquisition time.

2. The robot system of claim 1, wherein the metrology processing portion is further configured to determine metrology position coordinates of the end tool position at the first image acquisition time based at least in part on the determined first relative positions of the first and second 2D scales.

3. The robot system of claim 1, wherein the first 2D scale coupling location is on the first rotary joint and a motion transverse to the first rotary axis during rotation of the first rotary joint causes a change in the relative position of the first 2D scale.

4. The robot system of claim 3, wherein the metrology processing portion is further configured to determine an angular orientation of the first 2D scale based at least in part on the first image of the first 2D scale as acquired by the first camera at the first image acquisition time.

5. The robot system of claim 1, wherein the first 2D scale coupling location is on the first arm portion and at least one of a bending or twisting of the first arm portion causes a change in the relative position of the first 2D scale.

6. The robot system of claim 1, wherein the metrology processing portion is further configured to:
determine a second relative position of the first 2D scale based at least in part on a second image of the first 2D scale as acquired by the first camera at a second image acquisition time; and
determine a second relative position of the second 2D scale based at least in part on a second image of the second 2D scale as acquired by the second camera at the second image acquisition time.

7. The robot system of claim 6, wherein the metrology processing portion is further configured to:
determine metrology position coordinates of a first end tool position at the first image acquisition time based at least in part on the determined first relative positions of the first and second 2D scales; and
determine metrology position coordinates of a second end tool position at the second image acquisition time based at least in part on the determined second relative positions of the first and second 2D scales.

8. The robot system of claim 7, wherein the metrology processing portion is further configured to utilize the determined metrology position coordinates of the first and second end tool positions to determine a dimension that is related to a distance between the first and second end tool positions.

9. The robot system of claim 8, wherein the dimension is a distance between first and second surface locations on a workpiece, and a contact point of the end tool contacts the first surface location on the workpiece at the first image acquisition time and contacts the second surface location on the workpiece at the second image acquisition time.

10. The robot system of claim 9, wherein the end tool is at least one of a touch probe or a scanning probe that is used for measuring the workpiece.

11. A method for operating a supplementary metrology position determination system that is utilized with a robot, the robot comprising:
a movable arm configuration, comprising:
a first arm portion mounted to a first rotary joint at a proximal end of the first arm portion, the first rotary joint having a first rotary axis, wherein the first arm portion has a second rotary joint located at a distal end of the first arm portion, the second rotary joint having a second rotary axis;
a second arm portion mounted to the second rotary joint at a proximal end of the second arm portion, such that the second arm portion rotates about the second rotary joint; and
an end tool mounting configuration for mounting an end tool, wherein the end tool mounting configuration is located proximate to a distal end of the movable arm configuration; and
a motion control system configured to control an end tool position of the end tool with a level of accuracy defined as a robot accuracy, based at least in part on sensing and controlling the angular positions of the first and second arm portions about the first and second rotary joints, respectively, using rotary sensors included in the robot; and
the supplementary metrology position determination system comprising:
first and second two-dimensional (2D) scales, each 2D scale comprising a nominally planar substrate and a plurality of respective imageable features distributed on the planar substrate; and
first and second cameras; and
the method comprising:
operating the first camera to acquire a first image of the first 2D scale at a first image acquisition time, wherein the first camera is coupled to the movable arm configuration of the robot at a first camera coupling location and defines a first reference position and the first 2D scale is coupled to the movable arm configuration at a first 2D scale coupling location;
operating the second camera to acquire a first image of the second 2D scale at the first image acquisition time, wherein the second camera is coupled to the movable arm configuration of the robot at a second camera coupling location and defines a second reference position and the second 2D scale is coupled to the movable arm configuration at a second 2D scale coupling location;
determining a first relative position of the first 2D scale based at least in part on the first image of the first 2D scale as acquired by the first camera at the first image acquisition time; and
determining a first relative position of the second 2D scale based at least in part on the first image of the second 2D scale as acquired by the second camera at the first image acquisition time.

12. The method of claim 11, further comprising determining metrology position coordinates of a first end tool position at the first image acquisition time based at least in part on the determined first relative positions of the first and second 2D scales.

13. The method of claim 11, further comprising:
operating the first camera to acquire a second image of the first 2D scale at a second image acquisition time;
operating the second camera to acquire a second image of the second 2D scale at the second image acquisition time;
determining a second relative position of the first 2D scale based at least in part on the second image of the first 2D scale as acquired by the first camera at the second image acquisition time; and
determining a second relative position of the second 2D scale based at least in part on the second image of the second 2D scale as acquired by the second camera at the second image acquisition time.

14. The method of claim 13, further comprising:
determining metrology position coordinates of a first end tool position at the first image acquisition time based at least in part on the determined first relative positions of the first and second 2D scales; and
determining metrology position coordinates of a second end tool position at the second image acquisition time based at least in part on the determined second relative positions of the first and second 2D scales.

15. The method of claim 14, further comprising utilizing the determined metrology position coordinates of the first and second end tool positions to determine a dimension that is related to a distance between the first and second end tool positions.

16. The method of claim 15, wherein the dimension is a distance between first and second surface locations on a workpiece, wherein a contact point of the end tool contacts the first surface location on the workpiece at the first image acquisition time and contacts the second surface location on the workpiece at the second image acquisition time.

17. The method of claim 11, further comprising:
coupling the first and second 2D scales to the movable arm configuration at the first and second 2D scale coupling locations, respectively;
coupling the first camera to the movable arm configuration at the first camera coupling location; and
coupling the second camera to the movable arm configuration at the second camera coupling location.

18. A supplementary metrology position determination system for use with a robot that comprises a movable arm configuration with an end tool mounting configuration for mounting an end tool and a motion control system configured to control an end tool position of the end tool, the supplementary metrology position determination system comprising:
first and second two-dimensional (2D) scales that are configured to be coupled to the movable arm configuration of the robot at first and second 2D scale coupling locations, respectively, each 2D scale comprising a nominally planar substrate and a plurality of respective imageable features distributed on the planar substrate;
a first camera for acquiring an image of the first 2D scale at an image acquisition time, wherein the first camera defines a first reference position and the first camera is configured to be coupled to the movable arm configuration at a first camera coupling location;
a second camera for acquiring an image of the second 2D scale at the image acquisition time, wherein the second camera defines a second reference position and the second camera is configured to be coupled to the movable arm configuration at a second camera coupling location; and
a metrology processing portion configured to:
determine a first relative position of the first 2D scale based at least in part on a first image of the first 2D scale as acquired by the first camera at a first image acquisition time; and
determine a first relative position of the second 2D scale based at least in part on a first image of the second 2D scale as acquired by the second camera at the first image acquisition time;
wherein metrology position coordinates of a first end tool position at the first image acquisition time are determined based at least in part on the determined first relative positions of the first and second 2D scales.

19. The robot system of claim 18, wherein the first 2D scale coupling location is on a first rotary joint of the movable arm configuration which has a first rotary axis and a motion transverse to the first rotary axis during rotation of the first rotary joint causes a change in the relative position of the first 2D scale.

20. The robot system of claim 19, wherein the metrology processing portion is further configured to determine an angular orientation of the first 2D scale based at least in part on the first image of the first 2D scale as acquired by the first camera at the first image acquisition time.

21. The robot system of claim 18, wherein the first 2D scale coupling location is on a first arm portion of the movable arm configuration and at least one of a bending or twisting of the first arm portion causes a change in the relative position of the first 2D scale.

* * * * *